US007853877B2

(12) United States Patent
Giesen et al.

(10) Patent No.: US 7,853,877 B2
(45) Date of Patent: *Dec. 14, 2010

(54) GALLERY USER INTERFACE CONTROLS

(75) Inventors: Ronald Stephen Giesen, Redmond, WA (US); Kenneth Coleman, Kirkland, WA (US); Aaron Weiss, Tucson, AZ (US); Zeke Koch, Seattle, WA (US); Mark Keller, San Jose, CA (US); Howard Cooperstein, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 641 days.

This patent is subject to a terminal disclaimer.

(21) Appl. No.: 10/982,073

(22) Filed: Nov. 5, 2004

(65) Prior Publication Data

US 2005/0097465 A1    May 5, 2005

Related U.S. Application Data

(63) Continuation of application No. 09/896,384, filed on Jun. 29, 2001, now Pat. No. 6,826,729.

(51) Int. Cl.
*G06F 3/00* (2006.01)

(52) U.S. Cl. .................... 715/711; 715/715; 715/710; 715/764; 715/772; 715/790; 715/802; 715/809

(58) Field of Classification Search ................ 715/713, 715/714, 715, 711, 710, 708, 709, 735, 739, 715/741, 763, 764, 767, 772, 788, 790, 802, 715/808, 809, 810, 815, 816, 817, 819, 820, 715/825, 841, 860, 859, 851, 861
See application file for complete search history.

(56) References Cited

U.S. PATENT DOCUMENTS 4,823,283 A    4/1989    Diehm et al. ............... 715/825

(Continued)

FOREIGN PATENT DOCUMENTS

EP    1 077 405 A2    2/2001

(Continued)

OTHER PUBLICATIONS

Charles Rich, Candace L. Sidner, "Segmented Interaction History in a Collaborative Interface Agent," 1997 ACM, pp. 23-30.

(Continued)

*Primary Examiner*—Weilun Lo
*Assistant Examiner*—Mylinh Tran
(74) *Attorney, Agent, or Firm*—Merchant & Gould

(57) ABSTRACT

A computing system for providing a user interface control to modify properties of items within a main application window. The computing system has a main application window, a gallery control window, a control object selection processing module, and a control object focus processing module. The main application window contains one or more application items, each application item having one or more control properties affecting a behavior of the application item. The gallery control window contains a list of one or more control objects for modifying control properties of the application items located within the main application window. Each of the control objects in the list of control objects includes a graphical icon having a selection portion and a properties portion and one or more control properties that affect one or more items within the main application window.

15 Claims, 10 Drawing Sheets

U.S. PATENT DOCUMENTS

| | | | |
|---|---|---|---|
| 5,155,806 A | 10/1992 | Hoeber et al. | 715/711 |
| 5,247,438 A | 9/1993 | Subas et al. | 700/90 |
| 5,323,314 A | 6/1994 | Baber et al. | 705/8 |
| 5,377,354 A | 12/1994 | Scannell et al. | 718/103 |
| 5,500,936 A | 3/1996 | Allen et al. | |
| 5,519,606 A | 5/1996 | Frid-Nielsen et al. | 705/9 |
| 5,559,944 A | 9/1996 | Ono | 715/841 |
| 5,570,109 A | 10/1996 | Jenson | 715/823 |
| 5,625,783 A | 4/1997 | Ezekiel et al. | 395/352 |
| 5,634,100 A | 5/1997 | Capps | 705/9 |
| 5,634,128 A | 5/1997 | Messina | 710/200 |
| 5,644,737 A | 7/1997 | Tuniman et al. | 715/810 |
| 5,734,915 A | 3/1998 | Roewer | 395/773 |
| 5,760,768 A | 6/1998 | Gram | 345/333 |
| 5,760,773 A | 6/1998 | Berman et al. | 715/808 |
| 5,761,646 A | 6/1998 | Frid-Nielsen et al. | 705/9 |
| 5,778,404 A | 7/1998 | Capps et al. | 715/531 |
| 5,805,167 A | 9/1998 | Van Cruyningen | 715/808 |
| 5,828,376 A | 10/1998 | Solimene et al. | 715/821 |
| 5,838,321 A | 11/1998 | Wolf | 345/343 |
| 5,842,009 A | 11/1998 | Borovoy et al. | 707/1 |
| 5,844,558 A | 12/1998 | Kumar et al. | 345/339 |
| 5,844,572 A | 12/1998 | Schott | 345/440 |
| 5,855,006 A | 12/1998 | Huemoeller et al. | 705/9 |
| 5,885,006 A | 3/1999 | Sheedy | 384/192 |
| 5,893,073 A | 4/1999 | Kasso et al. | 705/8 |
| 5,893,125 A * | 4/1999 | Shostak | 715/206 |
| 5,898,436 A | 4/1999 | Stewart et al. | 345/354 |
| 5,899,979 A | 5/1999 | Miller et al. | 705/9 |
| 5,905,863 A | 5/1999 | Knowles et al. | 709/206 |
| 5,926,806 A | 7/1999 | Marshall et al. | 707/3 |
| 5,936,625 A | 8/1999 | Kahl et al. | 715/775 |
| 5,937,160 A | 8/1999 | Davis et al. | 709/203 |
| 5,940,078 A | 8/1999 | Nagarajayya et al. | 345/346 |
| 5,943,051 A | 8/1999 | Onda et al. | 715/786 |
| 5,960,406 A | 9/1999 | Rasansky et al. | 705/9 |
| 5,970,466 A | 10/1999 | Detjen et al. | 705/8 |
| 5,999,938 A | 12/1999 | Bliss et al. | 707/102 |
| 6,008,806 A | 12/1999 | Nakajima et al. | 345/335 |
| 6,016,478 A | 1/2000 | Zhang et al. | 705/9 |
| 6,018,343 A | 1/2000 | Wang et al. | 345/356 |
| 6,034,683 A | 3/2000 | Mansour et al. | 715/764 |
| 6,038,542 A | 3/2000 | Ruckdashel | 705/9 |
| 6,067,087 A | 5/2000 | Krauss et al. | 715/762 |
| 6,101,480 A | 8/2000 | Conmy et al. | 705/9 |
| 6,133,915 A | 10/2000 | Arcuri et al. | 715/779 |
| 6,175,363 B1 | 1/2001 | Williams et al. | 345/334 |
| 6,236,396 B1 | 5/2001 | Jenson et al. | 715/764 |
| 6,278,450 B1 | 8/2001 | Arcuri et al. | 345/334 |
| 6,289,317 B1 | 9/2001 | Peterson | 705/7 |
| 6,307,544 B1 | 10/2001 | Harding | 715/709 |
| 6,323,883 B1 | 11/2001 | Minoura et al. | 715/784 |
| 6,326,962 B1 | 12/2001 | Szabo | 715/762 |
| 6,359,634 B1 | 3/2002 | Cragun et al. | 715/777 |
| 6,373,507 B1 | 4/2002 | Camara et al. | |
| 6,384,849 B1 | 5/2002 | Morcos et al. | 715/810 |
| 6,424,829 B1 | 7/2002 | Kraft | 455/412.1 |
| 6,429,882 B1 | 8/2002 | Abdelnur et al. | 345/763 |
| 6,433,801 B1 | 8/2002 | Moon et al. | 345/840 |
| 6,456,304 B1 | 9/2002 | Angiulo et al. | |
| 6,459,441 B1 | 10/2002 | Perroux et al. | 345/837 |
| 6,466,236 B1 | 10/2002 | Pivowar et al. | 715/835 |
| 6,469,722 B1 | 10/2002 | Kinoe et al. | |
| 6,480,865 B1 | 11/2002 | Lee et al. | 715/523 |
| 6,493,006 B1 | 12/2002 | Gourdol et al. | 715/825 |
| 6,546,417 B1 | 4/2003 | Baker | 709/206 |
| 6,570,596 B2 | 5/2003 | Frederiksen | 715/808 |
| 6,578,192 B1 | 6/2003 | Boehme et al. | 717/115 |
| 6,618,732 B1 | 9/2003 | White et al. | 707/103 |
| 6,621,504 B1 * | 9/2003 | Nadas et al. | 715/723 |
| 6,621,508 B1 | 9/2003 | Shiraishi et al. | 715/810 |
| 6,635,089 B1 | 10/2003 | Burkett et al. | 715/513 |
| 6,664,983 B2 | 12/2003 | Ludolph | 715/775 |
| 6,680,749 B1 | 1/2004 | Anderson et al. | 348/231.99 |
| 6,686,938 B1 | 2/2004 | Jobs et al. | 345/835 |
| 6,708,205 B2 | 3/2004 | Sheldon et al. | 709/206 |
| 6,727,919 B1 | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,890 B1 | 6/2004 | Sugimoto | 715/838 |
| 6,785,868 B1 | 8/2004 | Raff | 715/530 |
| 6,826,729 B1 | 11/2004 | Giesen et al. | 715/837 |
| 6,850,255 B2 | 2/2005 | Muschetto | 715/788 |
| 6,871,195 B2 | 3/2005 | Ryan et al. | 706/46 |
| 6,882,354 B1 | 4/2005 | Nielson | 715/784 |
| 6,904,449 B1 | 6/2005 | Quinones | 709/203 |
| 6,915,492 B2 | 7/2005 | Kurtenbach et al. | 715/810 |
| 6,924,797 B1 | 8/2005 | MacPhail | 345/326 |
| 6,964,025 B2 | 11/2005 | Angiulo | 715/838 |
| 6,983,889 B2 | 1/2006 | Alles | 236/49.1 |
| 6,988,241 B1 | 1/2006 | Guttman et al. | 715/503 |
| 6,990,637 B2 | 1/2006 | Anthony et al. | 715/851 |
| 7,032,210 B2 | 4/2006 | Alloing et al. | 717/106 |
| 7,039,596 B1 | 5/2006 | Lu | 705/8 |
| 7,046,848 B1 | 5/2006 | Olcott | 382/176 |
| 7,107,544 B1 | 9/2006 | Luke | 715/752 |
| 7,110,936 B2 | 9/2006 | Hiew et al. | 703/22 |
| 7,152,207 B1 * | 12/2006 | Underwood et al. | 715/526 |
| 7,181,697 B2 | 2/2007 | Tai et al. | 715/779 |
| 7,188,073 B1 | 3/2007 | Tam et al. | 705/9 |
| 7,240,323 B1 | 7/2007 | Desai et al. | 717/100 |
| 7,249,325 B1 | 7/2007 | Donaldson | 715/777 |
| 7,325,204 B2 | 1/2008 | Rogers | 715/792 |
| 7,328,409 B2 | 2/2008 | Awada et al. | 715/765 |
| 7,346,705 B2 | 3/2008 | Hullot et al. | 709/238 |
| 7,392,249 B1 | 6/2008 | Harris et al. | |
| 7,395,221 B2 | 7/2008 | Doss et al. | 705/9 |
| 7,421,660 B2 | 9/2008 | Charmock et al. | 715/751 |
| 7,472,117 B2 | 12/2008 | Dettinger et al. | 1/1 |
| 7,703,036 B2 | 4/2010 | Satterfield et al. | 715/777 |
| 7,707,255 B2 | 4/2010 | Satterfield et al. | 709/206 |
| 7,711,742 B2 | 5/2010 | Bennett et al. | 707/759 |
| 7,716,593 B2 | 5/2010 | Durazo et al. | 715/752 |
| 7,739,259 B2 | 6/2010 | Hartwell et al. | 707/706 |
| 7,747,966 B2 | 6/2010 | Leukart et al. | 715/792 |
| 2001/0035882 A1 | 11/2001 | Stoakley et al. | 715/779 |
| 2002/0007380 A1 | 1/2002 | Bauchot et al. | 707/530 |
| 2002/0037754 A1 | 3/2002 | Hama et al. | 455/566 |
| 2002/0070977 A1 | 6/2002 | Morcos et al. | 345/810 |
| 2002/0075330 A1 * | 6/2002 | Rosenzweig et al. | 345/854 |
| 2002/0078143 A1 | 6/2002 | DeBoor et al. | |
| 2002/0091739 A1 | 7/2002 | Ferlitsch et al. | 707/526 |
| 2002/0122071 A1 | 9/2002 | Camara et al. | |
| 2002/0133557 A1 | 9/2002 | Winarski | 709/207 |
| 2002/0135621 A1 | 9/2002 | Angiulo et al. | 345/838 |
| 2002/0140731 A1 | 10/2002 | Subramaniam et al. | 345/762 |
| 2002/0140740 A1 | 10/2002 | Chen | |
| 2002/0149623 A1 | 10/2002 | West et al. | 345/765 |
| 2002/0149629 A1 * | 10/2002 | Craycroft et al. | 345/861 |
| 2002/0154178 A1 | 10/2002 | Barnett et al. | 715/853 |
| 2002/0163538 A1 | 11/2002 | Shteyn | 345/752 |
| 2002/0175955 A1 | 11/2002 | Gourdol et al. | 345/821 |
| 2002/0196293 A1 | 12/2002 | Suppan et al. | 345/853 |
| 2003/0009455 A1 | 1/2003 | Carlson et al. | 707/6 |
| 2003/0011638 A1 | 1/2003 | Chung | 345/808 |
| 2003/0011639 A1 | 1/2003 | Webb | 345/808 |
| 2003/0014490 A1 | 1/2003 | Bates et al. | 709/206 |
| 2003/0035917 A1 | 2/2003 | Hyman | 428/67 |
| 2003/0038832 A1 | 2/2003 | Sobol | |
| 2003/0043211 A1 | 3/2003 | Kremer et al. | |
| 2003/0066025 A1 | 4/2003 | Garner et al. | 715/500 |
| 2003/0070143 A1 | 4/2003 | Maslov | 715/513 |
| 2003/0093490 A1 | 5/2003 | Yamamoto et al. | 709/213 |
| 2003/0097361 A1 | 5/2003 | Huang et al. | 707/10 |

| | | | |
|---|---|---|---|
| 2003/0110191 A1 | 6/2003 | Handsaker et al. | 707/503 |
| 2003/0112278 A1 | 6/2003 | Driskell | 715/788 |
| 2003/0156140 A1 | 8/2003 | Watanabe | 345/810 |
| 2003/0167310 A1 | 9/2003 | Moody et al. | 709/206 |
| 2003/0195937 A1 | 10/2003 | Kircher et al. | 709/207 |
| 2003/0206646 A1 | 11/2003 | Brackett | |
| 2003/0226106 A1 | 12/2003 | McKellar et al. | 715/513 |
| 2003/0233419 A1 | 12/2003 | Beringer | 709/206 |
| 2004/0012633 A1 | 1/2004 | Helt | |
| 2004/0056894 A1 | 3/2004 | Zaika et al. | 345/762 |
| 2004/0090315 A1 | 5/2004 | Mackjust et al. | 340/426.13 |
| 2004/0100504 A1 | 5/2004 | Sommer | 345/810 |
| 2004/0109025 A1 | 6/2004 | Hullot et al. | 715/764 |
| 2004/0109033 A1 | 6/2004 | Vienneau et al. | 345/863 |
| 2004/0133854 A1 | 7/2004 | Black | 715/517 |
| 2004/0142720 A1 | 7/2004 | Smethers | 455/550.1 |
| 2004/0168153 A1 | 8/2004 | Marvin | 717/120 |
| 2004/0186775 A1 | 9/2004 | Margiloff et al. | 705/14 |
| 2004/0230508 A1 | 11/2004 | Minnis et al. | 705/35 |
| 2004/0230906 A1 | 11/2004 | Pik et al. | 715/522 |
| 2004/0261013 A1 | 12/2004 | Wynn et al. | 715/511 |
| 2004/0268231 A1 | 12/2004 | Tunning | 715/513 |
| 2005/0005249 A1 | 1/2005 | Hill et al. | 715/963 |
| 2005/0010871 A1 | 1/2005 | Ruthfield et al. | 715/712 |
| 2005/0021504 A1 | 1/2005 | Atchison | 707/3 |
| 2005/0022116 A1 | 1/2005 | Bowman et al. | 715/513 |
| 2005/0039142 A1 | 2/2005 | Jalon et al. | 715/823 |
| 2005/0044500 A1 | 2/2005 | Orimoto et al. | 715/706 |
| 2005/0057584 A1 | 3/2005 | Gruen et al. | 345/752 |
| 2005/0114778 A1 | 5/2005 | Branson et al. | 715/711 |
| 2005/0117179 A1 | 6/2005 | Ito et al. | 358/1.15 |
| 2005/0138576 A1 | 6/2005 | Baumert et al. | 715/862 |
| 2005/0172262 A1 | 8/2005 | Lalwani | 717/109 |
| 2005/0183008 A1 | 8/2005 | Crider et al. | 715/517 |
| 2005/0223329 A1 | 10/2005 | Schwartz et al. | 715/711 |
| 2005/0278656 A1 | 12/2005 | Goldthwaite et al. | 715/810 |
| 2005/0289159 A1 | 12/2005 | Weiss et al. | 707/100 |
| 2006/0036580 A1 | 2/2006 | Stata | 707/3 |
| 2006/0036945 A1 | 2/2006 | Radtke et al. | 715/708 |
| 2006/0036965 A1 | 2/2006 | Harris et al. | 715/777 |
| 2006/0069686 A1 | 3/2006 | Beyda et al. | 707/10 |
| 2006/0095865 A1 | 5/2006 | Rostom | 715/810 |
| 2006/0101051 A1 | 5/2006 | Carr et al. | 707/102 |
| 2006/0101350 A1 | 5/2006 | Scott | 715/770 |
| 2006/0111931 A1 | 5/2006 | Johnson et al. | 705/1 |
| 2006/0129937 A1 | 6/2006 | Shafron | 715/733 |
| 2006/0155689 A1 | 7/2006 | Blakeley et al. | 707/3 |
| 2006/0218500 A1 | 9/2006 | Sauve et al. | 715/767 |
| 2006/0242557 A1 | 10/2006 | Nortis III | 715/234 |
| 2006/0242575 A1 | 10/2006 | Winser | 715/530 |
| 2007/0106571 A1 | 5/2007 | McCormack et al. | 715/764 |
| 2008/0040682 A1 | 2/2008 | Sorenson et al. | 715/777 |
| 2008/0178110 A1 | 7/2008 | Hill et al. | 715/771 |
| 2008/0005686 A1 | 10/2008 | Singh | |
| 2010/0060645 A1 | 3/2010 | Garg et al. | 345/440 |
| 2010/0180226 A1 | 7/2010 | Satterfield et al. | 715/777 |
| 2010/0191818 A1 | 7/2010 | Satterfield et al. | 709/206 |
| 2010/0211889 A1 | 8/2010 | Durazo et al. | 715/752 |
| 2010/0223575 A1 | 9/2010 | Leukart et al. | 715/779 |

FOREIGN PATENT DOCUMENTS

| | | |
|---|---|---|
| EP | 1223503 | 7/2002 |
| EP | 1376337 | 2/2004 |
| GB | 2391148 | 1/2004 |
| WO | WO 99/04353 | 1/1999 |
| WO | WO 99/27495 | 6/1999 |
| WO | WO 2008/121718 A1 | 9/2008 |

OTHER PUBLICATIONS

Andrew Dwelly, "Functions and Dynamic User Interfaces," 1989 ACM, pp. 371-381.

Alias I. Wavefront, "The Hotbox: Efficient Access to a Large Number of Menu-items," ACM 1999, pp. 231-237.

Charles Rich, Candace L. Sidner, "Adding a Collaborative Agent to Graphical User Interfaces," 1996 ACM, pp. 21-30.

U.S. Official Action mailed Dec. 23, 2003 in U.S. Appl. No. 09/896,384.

U.S. Official Action mailed Aug. 24, 2004 in U.S. Appl. No. 09/896,384.

U.S. Appl. No. 10/982,073, filed Nov. 5, 2004, entitled "Gallery User Interface Controls".

U.S. Appl. No. 10/836,154, filed Apr. 30, 2004, entitled "Combined Content Selection and Display User Interface".

U.S. Appl. No. 10/848,774, filed May 19, 2004, entitled "Automatic Grouping of Electronic Mail".

Boyce, "Microsoft Outlook Inside Out," 2001, pp. 67, 68, 109, 110, 230, 231, 310, 316-318, 798.

Halvorson and Young, "Microsoft Office XP Inside Out," 2001, pp. 1005-1009, 1015, 1023-1028, 1036-1039, 1093.

Riggsby, McCoy, Haberman and Falciani, "Mastering Lotus Notes and Domino 6," 2003, pp. 135-139.

U.S. Appl. No. 10/851,442, filed May 21, 2004, entitled "Conversation Grouping of Electronic Mail Records".

Riggsby, McCoy, Haberman and Falciani, "Mastering Lotus Notes and Domino 6," 2003, pp. 135-138, 607-612.

U.S. Appl. No. 10/851,506, filed May 21, 2004, entitled "Adaptive Multi-Line View User Interface".

Examination Report, Jul. 25, 2005.

Search Report, Danish Patent and Trademark Office, Sep. 18, 2006.

Written Opinion, Danish Patent and Trademark Office, Sep. 18, 2006.

Search Report, Danish Patent and Trademark Office, Sep. 19, 2006.

U.S. Appl. No. 10/955,940, filed Sep. 30, 2004, entitled "User Interface for Displaying Selectable Software Functionality Controls that are Contextually Relevant to a Selected Object".

U.S. Appl. No. 10/955,967, filed Sep. 30, 2004, entitled "Command User Interface for Displaying Selectable Software Functionality Controls".

U.S. Appl. No. 10/955,942, filed Sep. 30, 2004, entitled "User Interface for Displaying a Gallery of Formatting Options Applicable to a Selected Object".

U.S. Appl. No. 10/955,928, filed Sep. 30, 2004, entitled "User Interface for Providing Task Management and Calendar Information".

U.S. Official Action mailed Apr. 27, 2006 in U.S. Appl. No. 10/800,056.

Amendment to Office Action of Apr. 27, 2006, dated Jul. 27, 2006 in U.S. Appl. No. 10/800,056.

U.S. Official Action mailed Oct. 19, 2006 in U.S. Appl. No. 10/800,056.

Amendment to Office Action of Oct. 19, 2006, dated Jan. 19, 2007 in U.S. Appl. No. 10/800,056.

U.S. Appl. No. U.S. 10/800,056, filed Mar. 12, 2004, entitled "Method and System for Data Binding in a Block Structured User Interface Scripting Language".

Khare and Rifkin, "The Origin of (Document) Species," University of California, 1998 (9 pages).

"Separate Structure and Presentation," http://www.webreference.com/html/tutorial5/1.html, Aug. 20, 1998 (4 pages).

"The Style Attribute and CSS Declarations," http://www:webreference.com/html/tutorial5/2, Aug. 20, 1998 (4 pages).

"What's Hot in Internet Services?," http://www.webreference.com/html/tutorial5/3, Aug. 20, 1998 (3 pages).

"The Style Element & CSS Selectors," http://www.webreference.com/html/tutorial5/4.html, Aug. 20, 1998 (e pages).

http://www/webreference.com/html/tutorial5/5.html, Aug. 20, 1998 (3 pages.

"ID & Class Selectors, Pseudoclasses," http://www.webreference.com/html/tutorial5/6.html, Aug. 20, 1998 (3 pages).

http://www.webreference,com/html/tutorial5/7.html, Aug. 20, 1998 (3 pages).

http://www.webreference,com/html/tutorial5/8.html, Aug. 20, 1998 (2 pages).

"External Style Sheets," http://www.webreference.com/html/tutorial5/10.html, Aug. 20, 1998 (3 pages).

Raman, "Cascaded Speech Style Sheets," 1997 (9 pages).

"Primary Windows," http://www-03.ibm.com/servers/eserver/iseries/navigator/guidelines/primary.html,, (23 pages).

"User Interface Standards," http://msdn2.microsoftt.com/en-us/library/aa217660(office.11,d=printer).aspx, Sep. 2001 (5 pages).

"WebSphere Studio Overview," http://researchweb.watson.ibm.com/journal/sj/432/budinsky.html, May 6, 2004 (25 pages).

U.S. Official Action mailed Feb. 14, 2007 in U.S. Appl. No. 10/800,056.

Dwelly, A., "Functions and Dynamic User Interfaces," pp. 371-381 (1989).

Kurtenbach, G. et al., "The Hotbox: Efficient Access to a Large Number of Menu-items," *CHI 99 15-20*, pp. 231-237 (May 1999).

Rich, C. et al., "Adding a Collaborative Agent to Graphical User Interfaces," pp. 21-30 (1996).

Rich, C. et al., "Segmented Interaction History in a Collaborative Interface Agent," pp. 23-30 (1997).

U.S. Final Office Action dated Dec. 21, 2007 cited in U.S. Appl. No. 10/851,506.

U.S. Final Office Action dated Dec. 28, 2007 cited in U.S. Appl. No. 10/800,056.

U.S. Final Office Action dated Jan. 8, 2008 cited in U.S. Appl. No. 10/955,928.

U.S. Office Action dated Sep. 26, 2007 cited in U.S. Appl. No. 11/151,686.

U.S. Office Action dated Jul. 13, 2007 cited in U.S. Appl. No. 10/800,056.

U.S. Final Office Action dated Dec. 4, 2007 cited in U.S. Appl. No. 10/955,940.

U.S. Office Action dated Jan. 28, 2008 cited in U.S. Appl. No. 10/836,154.

U.S. Appl. No. 12/028,797, filed Feb. 9, 2008 entitled "Side-by-Side Shared Calendars".

U.S. Office Action dated Feb. 20, 2008 cited in U.S. Appl. No. 10/848,774.

U.S. Office Action dated Feb. 21, 2008 cited in U.S. Appl. No. 10/851,442.

Marshall School of Business, Workshop 1—Introduction to Outlook & E-mail, Apr. 6, 2000, pp. 1-11.

Jane Dorothy Calabria Burke, Ten Minute Guide to Lotus Notes 4.6, Publication date: Dec. 23, 1997, 2 pgs.

Bill Dyszel, Microsoft Outlook 2000 for Windows for Dummies, Copyright 1999, pp. 82-86, 102-103, 141,143.

Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.

U.S. Final Office Action dated Apr. 15, 2008 cited in U.S. Appl. No. 10/955,942.

Screendumps Microsoft Corporation, Microsoft Office Professional Edition 2003, 5 pgs.

U.S. Final Office Action dated Apr. 16, 2008 cited in U.S. Appl. No. 10/955,967.

Screendumps Microsoft Corporation, Microsoft Office Professional Edition 2003, 4 pgs.

Chinese Official Action dated Mar. 21, 2008 cited in Chinese Application No. 200510092146.4.

Chinese Official Action dated Mar. 21, 2008 cited in Chinese Application No. 200510092139.4.

Philippine Official Action dated Apr. 21, 2008 cited in Philippine Application No. 1-2005-000405.

Philippine Official Action dated Apr. 21, 2008 cited in Philippine Application No. 1-2005-000406.

U.S. Final Office Action dated Apr. 29, 2008 cited in U.S. Appl. No. 10/955,941.

Habraken, Microsoft Office XP 8 in 1, published Jun. 5, 2001, http://proquest.safaribooksonline.com/0789725096/, 12 pgs.

Word 2002, Chapter 14; Paradigm Publishing Inc., copyright 2002; http://www.emcp.com/tech_tutorials/sig_irc/ Signature_Word_Chapter_14.ppt, 21 pgs.

Chilean Office Action dated Mar. 28, 2008 cited in Application No. 1770-05, no English Translation.

Chinese First Office Action dated Apr. 11, 2008 cited in U.S. Appl. No. 200510092141.1.

U.S. Final Office Action dated Jul. 24, 2008 cited in U.S. Appl. No. 11/151,686.

Microsoft Office Word 2003. Part of Microsoft Office Professional Edition 2003. Copyright 1983-2003 Microsoft Corporation.

Microsoft Office Word 2003, Part of Microsoft Office Professional Edition 2003, 1983-2003 Microsoft Corporation, screen shot 1, 1 pp.

Microsoft Office 2003, Microsoft Office Professional Edition 2003, Microsoft Corporation, 10 pages.

Screendumps—Microsoft Office, Microsoft Office Professional Edition 2003, Microsoft Corporation, 10 pages.

Screendumps—Microsoft Office Outlook, Microsoft Office Outlook Professional Edition 2003, Microsoft Corporation, 2 pages.

Chilean Office Action dated Nov. 27, 2008 cited in Appln No. 1768-2005.

Chilean Office Action dated Sep. 23, 2008 cited in Appln No. 1770-2005.

Chilean Office Action dated Nov. 27, 2008 cited in Appln No. 1769-2005.

Nielsen, Jacob. "Tabs, Used Right," Alertbox, Sep. 17, 2007, http://www.useit.com/alertbox/tabs.html, 6 pages.

"Managing the Code Editor and View" Microsoft Corporation, http://msdn.microsoft.com/en-us/library/z01zks9a(VS.71).aspx, 2008.

Agarwal, Vikash K., "Creating a Visually Arresting User-Interface: A₃D Tab Control Example," Jan. 4, 2008, http://microsoft.apress.com/asptodayarchive/71723/creating-a- visually-arresting-user-interface-a-3d-tab-control-example, 12 pages.

"Omni Web Help," Omni Group, 2004, http://www.omnigroup.com/documentation/omniweb/brower/tabs.html.

Hepfner, Troy, "New SOCET CXP Interface Improves Usability," Sep. 2008, http://www.socetset.com/gxpmosaic/?p=95, 4 pages.

Screendumps—Microsoft Office, Microsoft Corporation, Microsoft Office Professional Edition 2003, 13 pages.

Russian Office Action dated Jul. 21, 2009 cited in Appln No. 2005125837/09(029011).

Russian Office Action dated Jul. 30, 2009 cited in Appln No. 2005125831/09(029005).

European Search Report dated Sep. 7, 2009 cited in EP Application No. 09006972.5-2211.

European Communication dated Sep. 14, 2009 cited in Appln. No. 07795391.7-1225.

U.S. Official Action dated Aug. 4, 2009 in U.S. Appl. No. 10/955,967.

U.S. Official Action dated Aug. 4, 2009 in U.S. Appl. No. 10/955,942.

U.S. Official Action dated Aug. 18, 2009 in U.S. Appl. No. 11/782,059.

U.S. Official Action dated Sep. 23, 2009 in U.S. Appl. No. 11/401,470.

Berliner E.M. et al., "Microsoft Office 2003", Feb. 24, 2004, p. 39-40, 120-124, 175-177, 233-234 [D1].

Berliner E.M. et al., "Microsoft Office 2003", Feb. 24, 2004, p. 173-178 [D2].

Israeli Office Action dated Sep. 6, 2009 cited in Appln No. 169716.

Israeli Office Action dated Sep. 7, 2009 cited in Appln No. 169718.

Russian Office Action dated Sep. 10, 2009 cited in Appln No. 2005125836/09(029010).

Russian Office Action dated Sep. 10, 2009 cited in Appln No. 2005125839/09(029013).

European Communication dated Sep. 28, 2009 cited in Appln No. 09006972.5-2211.

Chinese Office Action dated Oct. 16, 2009 cited in Appln No. 200510092142.6.

U.S. Official Action dated Nov. 24, 2009 in U.S. Appl. No. 11/445,393.

Perronne et al. "Building Java Enterprise Systems with J2EE", Publisher: Sams, Pub Date: Jun. 7, 2000 (pp. 1-8).

Russian Office Action dated Oct. 26, 2009 cited in Appln No. 2005120363/09(023023).

PCT Search Report and Written Opinion dated Dec. 29, 2009 cited in International Application No. PCT/US2009/046344.

U.S. Official Action dated Jul. 9, 2008 cited in U.S. Appl. No. 11/136,800.

U.S. Official Action dated Jun. 24, 2009 in U.S. Appl. No. 10/607,020.

U.S. Official Action dated Nov. 13, 2009 in U.S. Appl. No. 11/154,278.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
U.S. Final Office Action dated Jan. 6, 2010 cited in U.S. Appl. No. 10/607,020.
U.S. Office Action dated Jan. 25, 2010 cited in U.S. Appl. No. 10/982,073.
U.S. Appl. No. 12/725,605, filed Mar. 17, 2010 entitled "Improved User Interface for Displaying Selectable Software Functionality Controls that are Relevant to a Selected Object".
U.S. Appl. No. 12/753,923, filed Apr. 5, 2010 entitled "Automatic Grouping of Electronic Mail".
Screendumps—Microsoft Office (Microsoft Corporation, Microsoft Office Professional Edition 2003; 16 pages).
Chinese Office Action dated Jan. 22, 2010 cited in Appln No. 200680032564.7.
Chilean Second Office Action dated Jan. 29, 2010 cited in Appln No. 1769-2005.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
U.S. Official Action dated Jan. 20, 2010 in U.S. Appl. No. 10/955,967.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Feb. 22, 2010 in U.S. Appl. No. 11/401,470.
U.S. Appl. No. 12/769,787, filed Apr. 29, 2010 entitled "Conversation Grouping of Electronic Mail Records".
U.S. Appl. No. 12/777,287, filed May 11, 2010 entitled "User Interface for Providing Task Management and Calendar Information".
U.S. Appl. No. 11/217,071, filed Aug. 30, 2005 entitled "Markup Based Extensibility for User Interfaces".
Clifton, The Application Automation layer—Using XML to Dynamically Generale GUI Elements—forms and controls, The Code Project, Jun. 2003, pp. 1-37.
Australian Office Action dated May 28, 2010 cited in Appln No. 2005202717.
U.S. Official Action dated Mar. 30, 2010 in U.S. Appl. No. 11/217,071.
U.S. Official Action dated Apr. 15, 2010 in U.S. Appl. No. 11/823,999.
U.S. Official Action dated May 5, 2010 in U.S. Appl. No. 10/851,506.
U.S. Official Action dated May 25, 2010 in U.S. Appl. No. 10/607,020.
U.S. Official Action dated Jun. 3, 2010 in U.S. Appl. No. 12/028,797.
U.S. Official Acton dated Jun. 22, 2010 in U.S. Appl. No. 11/430,562.
U.S. Official Action dated Jun. 23, 2010 in U.S. Appl. No. 10/955,940.
U.S. Official Action dated Jul. 1, 2010 in U.S. Appl. No. 11/782,059.
U.S. Official Action dated Jul. 6, 2010 in U.S. Appl. No. 10/955,967.
ScreenShot of MS_Office_2003; (Microsoft Corporation, Microsoft Office Professional Edition 2003; 6 pages).
U.S. Office Action dated Nov. 25, 2008 cited in U.S. Appl. No. 11/154,278.
U.S. Appl. No, 11/154,278, filed Jun. 16, 2005 entitled "Cross Version and Cross Product User Interface Compatibility".
U.S. Appl. No. 11/151,686, filed Jun. 13, 2005 entitled "Floating Command Object".
U.S. Appl. No. 11/401,470, filed Apr. 10, 2006 entitled "Command User Interface for Displaying Selectable Functionality Controls in a Database Application".
U.S. Appl. No. 10/607,020, filed Jun. 26, 2003 entitled "Side-by-Side Shared Calendars".
U.S. Appl. No. 10/741,407, filed Dec. 19, 2003 entitled "Methods, Systems, and Computer-Readable Mediums for Providing Persisting and Continuously Updating Search Folders".
U.S. Appl. No. 11/782,059, filed Jul. 24, 2007 entitled "Methods, Systems, and Computer-Readable Mediums for Providing Persisting and Continuously Updating Search Folders".
U.S. Appl. No. 10/955,941, filed Sep. 30, 2004 entitled "An Improved User Interface for Displaying Selectable Software Functionality Controls that are Relevant to a Selected Object".
Gordon Padwick, Using Microsoft Outlook 2000, Que, Sp. Ed., May 1999.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. On Management of Data, Proc. Of the 2000 ACM SIGMOD Int. Conf. On Management of Data, pp. 379-390, 2000.
Marshall School of Business: "Workshop IV—Calendar," http://www.marshall.usc.edu/computing/PDF_Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version 2002.03.25, http://www.uakron.edu/its/learning/training/docs/Calendar032502.pdf, Mar. 25, 2002, pp. 1-52.
Screen Dumps of Microsoft Outlook (1999, pp. 1-3).
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive. org/web/20040812092939/http://www.ipi.fi/~rainy/index.php?pn=probjects&project=rainlendar>.
Microsoft Windows XP Professional, Version 2002, Service pack 2, 3 pgs.
Camarda, Using Microsoft Word 97, copyright 1997, QUE Corporation, pp. 412, 968.
Australian Search Report dated Jan. 16, 2007 cited in Singapore Application No. 200504474-8.
PCT Search Report dated Feb. 26, 2007 cited in International Application No. PCT/US2006/034993.
European Communicated dated Oct. 20, 2005 cited in EP Application No. 04102463.0-2211 PCT/.
Australian Written Opinion/Search Report cited in Singapore Application No. 200505257-6 mailed Feb. 12, 2007.
U.S. Office Action dated Apr. 12, 2007 cited in U.S. Appl. No. 10/851,506.
U.S. Office Action dated Jun. 4, 2007 cited in U.S. Appl. No. 10/955,940.
U.S. Office Action dated Jul. 26, 2006 cited in U.S. Appl. No. 10/741,407.
U.S. Final Office Action dated Jan. 23, 2007 cited in U.S. Appl. No. 10/741,407.
U.S. Notice of Allowance dated Apr. 10, 2007 cited in U.S. Appl. No. 10/741,407.
U.S. Office Action dated Jan. 4, 2007 cited in U.S. Appl. No. 10/607,020.
U.S. Office Action dated Jun. 14, 2007 cited in U.S. Appl. No. 10/836,154.

U.S. Office Action dated Jun. 21, 2007 cited in U.S. Appl. No. 10/955,928.
U.S. Notice of Allowance dated Jul. 5, 2007 cited in U.S. Appl. No. 10/607,020.
U.S. Office Action dated Jul. 11, 2007 cited in U.S. Appl. No. 10/955,941.
U.S. Office Action dated Jul. 11, 2007 cited in U.S. Appl. No. 10/955,967.
U.S. Office Action dated Jul. 11, 2007 cited in U.S. Appl. No. 10/955,942.
Philippines Examiner's Action dated Aug. 19, 2008 cited in Application No. 1-2005-000405.
Chinese Second Office Action dated Oct. 10, 2008 cited in Application No. 200510092141.1.
Chinese Second Office Action dated Oct. 17, 2008 cited in Application No. 200510092139.4.
U.S. Final Office Action dated Oct. 28, 2008 cited in U.S. Appl. No. 11/151,686.
Philippine Official Action dated Jul. 31, 2008 cited in Philippine Application No. 12005000495.
European Communication dated Jun. 23, 2008 cited in European Application No. 04102463.9-2211/1517239.
Chinese First Office Action dated Apr. 18, 2008 cited in Application No. 200510092142.6.
Chinese First Office Action dated May 23, 2008 cited in Application No. 200510089514.X.
Philippines Examiner's Action dated Sep. 12, 2008 cited in Application No. 1200500406.
Microsoft Office 11 Beta Layperson's Specification, Copyright 2002, Microsoft Corporation, 28 pgs.
FrontPage 11 Beta Layperson's Specification, Copyright 2002, Microsoft Corporation, 12 pgs.
Office 11 Beta Letter, Copyright 2002, Microsoft Corporation, 6 pgs.
Microsoft XDocs Beta Layperson Specification, Copyright 2002, Microsoft Corporation, 3 pgs.
Microsoft Publisher 11 Beta Layperson's Specification, Copyright 2002, Microsoft Corporation, 13 pgs.
Halvorson et al., Microsoft Office Professional Official Manual, Aug. 20, 2002, 10 pgs.
Chinese Second Office Action dated Jul. 6, 2010 cited in Appln No. 200680033212.3.
Mexican Office Action dated Aug. 12, 2010 cited in Appln No. 2005/008354.
U.S. Official Action dated Aug. 2, 2010 in U.S. Appl. No. 10/955,942.
U.S. Official Action dated Aug. 6, 2010 in U.S. Appl. No. 11/401,470.
U.S. Official Action dated Sep. 21, 2010 in U.S. Appl. No. 11/217,071.
U.S. Official Action dated Sep. 27, 2010 in U.S. Appl. No. 10/836,154.
Malaysian Substantive Examination Adverse Report dated Sep. 30, 2010 cited in Appln No. PI 20052959.
PCT Written Opinion and Search Report dated Sep. 2, 2010 cited in International Application No. PCT/US2010/021888.
Australian Office Action dated Oct. 21, 2010 cited in Appln No. 2006284908.
Chinese Second Office Action dated Oct. 29, 2010 cited in Appln No. 200680030421.2.

* cited by examiner

GALLERY USER INTERFACE CONTROLS

RELATED APPLICATION

This application is a continuation of U.S. patent application Ser. No. 09/896,384, filed on Jun. 29, 2001, the entirety of which is hereby incorporated by reference.

TECHNICAL FIELD

This application relates in general to a method, apparatus, and article of manufacture for providing a user interface control for selecting one or more options from a larger set of options, and more particularly to a method, apparatus, and article of manufacture for providing a user interface control for selecting one or more options from a larger set of options where each of the options may have a set of one or more user selectable properties.

BACKGROUND

The increasing capability of computing system has routinely permitted program developers to attempt to add an ever-increasing number of features and options to application programs. Each of these features and options requires a user of the application program to interact with the application program to configure and use these features and options. As such, a user interface control has been needed to present users with a large number of control objects that may be selected. In addition, each of these control objects may individually have properties and settings that a user may wish to manipulate in order to achieve a desired result.

In the past, user interface controls have been constructed using dialog boxes that appeared when a user makes a selection of a control. Typically, a control was selected using function keys, drop-down menus, and right-mouse clicks on an object within a main application window. This selection operation caused a large dialog box or window to be presented to the user in which a control setting or property could be changed. Once a user has made a selection by either clicking upon a setting or highlighting a setting an clicking upon an "OK" or "DONE" button, the dialog box would disappear and the new setting or property would be applied to the appropriate object within the main application window.

This process is not an efficient use of a user's efforts in that a dialog box is presented and removed repeatedly if a user wishes to examine a plurality of possible choices while deciding which setting is actually desired. In addition, many selections themselves possess selectable properties that may need manipulation for a user to arrive at a desired set of properties to achieve the desired result. In the past, these additional properties would be controlled using a second, or settings, dialog box which is launched using a button located upon the first, or main, dialog box. A user would need to navigate through these multiple levels of dialog boxes and windows to set a control to be active and configured as desired.

With the opening of these dialog boxes, the main application window is typically obscured by the dialog box and the settings dialog box launched from the main dialog box. The screen is redrawn when the various dialog boxes are closed and the new control settings are applied. The above sequence of operations typically breaks the flow of a user as he or she interacts with a main application window which typically maintains the items of interest. The user will need to focus on these controls and dialog boxes, and not the main application window, and when the boxes are gone, refocus upon the main application window and any changes made by the application of the new control settings.

A new user interface control gallery addresses the limitations of the prior design for controls using dialog boxes by providing a user-selectable set of gallery control objects within a separate gallery control window.

SUMMARY

In accordance with the present invention, the above and other problems are solved by providing a method, apparatus, and article of manufacture for providing a user interface control for selecting one or more options from a larger set of options where each of the options has a set of one or more user selectable properties.

One such aspect of the present invention is a method for providing a user interface control to act on one or more items from a list in a variety of ways. The method renders a list of control objects, each of which comprise a graphical icon having a selection portion and a properties portion and one or more control properties. The method also receives a selection mouse click upon a selection portion of the first control object, and applies the control properties of the first control object.

Another aspect of the present invention is a computing system for providing a user interface control to modify properties of items within a main application window. The computing system has a main application window, a gallery control window, a control object selection processing module, and a control object focus processing module. The main application window contains one or more application items, each application item having one or more control properties affecting a behavior of the application item. The gallery control window contains a list of one or more control objects for modifying control properties of the application items located within the main application window. Each of the control objects in the list of control objects comprise a graphical icon having a selection portion and a properties portion and one or more control properties that affect one or more items within the main application window. The control object selection processing module for modifying one or more application items within the main application window based upon current values of control properties of a selected control object selected using a mouse click located upon a selection portion of the selected control object. The control object focus processing module for modifying current values of control properties of a focus control object identified using a mouse click located upon a properties portion of the focus control object.

These and various other features as well as advantages, which characterize the present invention, will be apparent from a reading of the following detailed description and a review of the associated drawings.

BRIEF DESCRIPTION OF THE DRAWINGS

Referring now to the drawings in which like reference numbers represent corresponding parts throughout.

DETAILED DESCRIPTION

This application relates in general to a method, apparatus, and article of manufacture for providing a user interface control for selecting one or more options from a larger set of options having user selectable properties.

Figure 1:
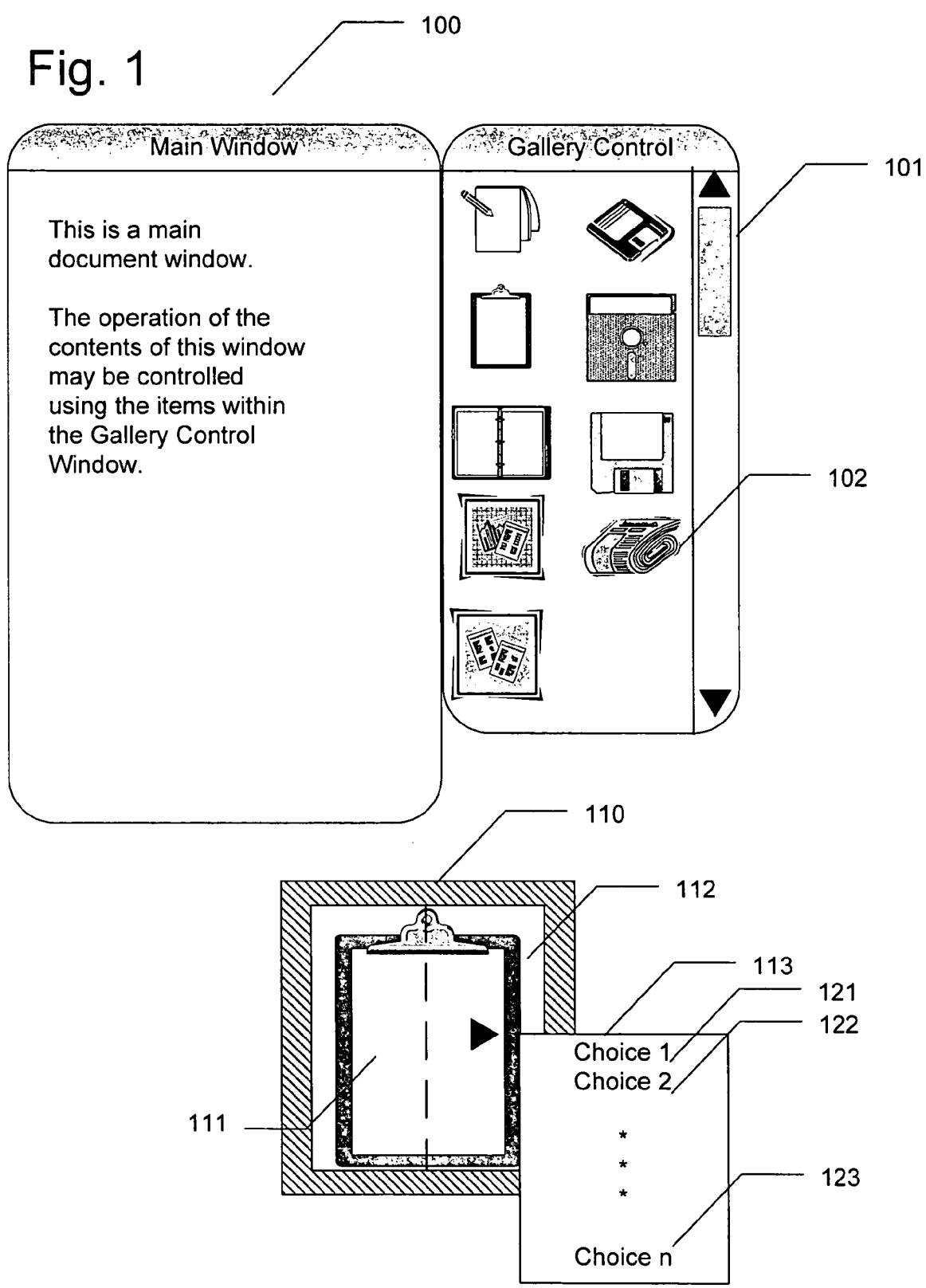
FIG. 1 illustrates a main application window and a gallery control window and a gallery control object according to one possible embodiment of the present invention.

FIG. 1 illustrates a main application window and a gallery control window and a gallery control object according to one possible embodiment of the present invention. Computing systems that utilize a graphical user interface (GUI) typically display application programs within a main application window 100. A user interacts with the application program by interacting with and manipulating objects and items within this main application window 100. In an exemplary embodiment the object and items within this main application window include text, graphical, multimedia, and similar data objects that are created, edited, manipulated, and used within an application window. One skilled in the art will recognize that the present invention of providing controls that alter or set a property on a data item and object allows properties to be set and manipulated regardless of the type of data item or object. The only requirement upon the controls is that the control possess the processing modules needed to manipulate the property as it applies to the types of data supported by the control within a given application program.

In addition to the main application window 100, a gallery control window 101 provides a user with a scrollable window that contains one or more gallery control objects 102. A user generates a mouse-click upon these gallery control objects 102 in order to cause a change to a control associated with an object within the main application window 100.

A gallery control object 102 includes a plurality of components as illustrated in FIG. 1. The gallery control object 102 is constructed using a rich content icon having a selection portion 111 and a properties portion 112 that is surrounded by a status indication 110. A pop-up menu 113 containing one or more menu items 121-123 is associated with the properties portion 112 of the icon. In an exemplary embodiment, the pop-up menu is presented to a user when the user moves a mouse cursor over the properties portion 112 of the icon. If a user places the mouse cursor over top of one of the menu items 121-123, the menu item 122 is highlighted. If the user generates a mouse click upon one of the menu items, a set of instructions and related processing is performed that relates to a property or use of the gallery control item 102.

The rich content icon provides a visual depiction that is associated with feature or property being implemented using the particular gallery control object. In the example embodiment shown in FIG. 1, the rich content icons are graphical objects containing pictures. These objects may be either black and white or color objects. Similarly, these objects may include formatted text that is rendered to fill the rich content icon. Text may be used within the rich content icon to illustrate formatting of text found within the main application window 100 using a particular combination of font formatting properties. As such, a user may see the likely result of selecting a particular gallery control object that controls the formatting of text within the main application window 100 from the contents of the rich content icon that renders text using its formatting properties.

The rich content icons may also contain photograph thumbnail images, video and similar multimedia data, and any other data that may be used to represent an icon. One skilled in the art will recognize that the use of text and graphical icons as described above is only one possible embodiment for the invention as recited within the attached claims.

When an item in the gallery control has focus through either having the mouse hover over it, or via the keyboard, a menu dropdown arrow is shown. When the item does not have focus, no arrow appears, allowing the user to see more of the rich content displayed for that item. If the user's mouse hovers over the menu dropdown arrow, the arrow is displayed in a deeper intensity using the Windows default selection color to indicate that the dropdown arrow is active and that a menu will appear if the user left-clicks this area with the mouse.

In other possible embodiments, menu items 121-123 are represented using text items that describe the function or property to be presented to a user when a particular menu item 121-123 is selected. The particular menu item 122 that is to be selected may be displayed in a different manner, such as reverse video or a different color from the other menu items 121, 123 in the list as to distinguish which of the menu items 121-123 is being selected. Additionally, the pop-up menu 113 may be located to the left and right of the gallery control object 110 as well as above and below the gallery control object 110 without deviating from the spirit and scope of the present invention as recited within the attached claims.

Throughout the remaining description of various gallery controls, example of these gallery controls are presented as being constructed as a collection of gallery control objects within a gallery control window. In these example embodiments, these gallery control windows 101 are presented as a separate window from the main application window 100 containing a listbox having the user interface characteristics as discussed herein as simply an example embodiment. One skilled in the art will recognize that any list of items presented within any listbox that is presented to a user to selection and modification may be constructed as part of a separate window and as part of any pop-up listbox to be within the spirit and scope of the present invention as recited within the attached claims.

Figure 2:
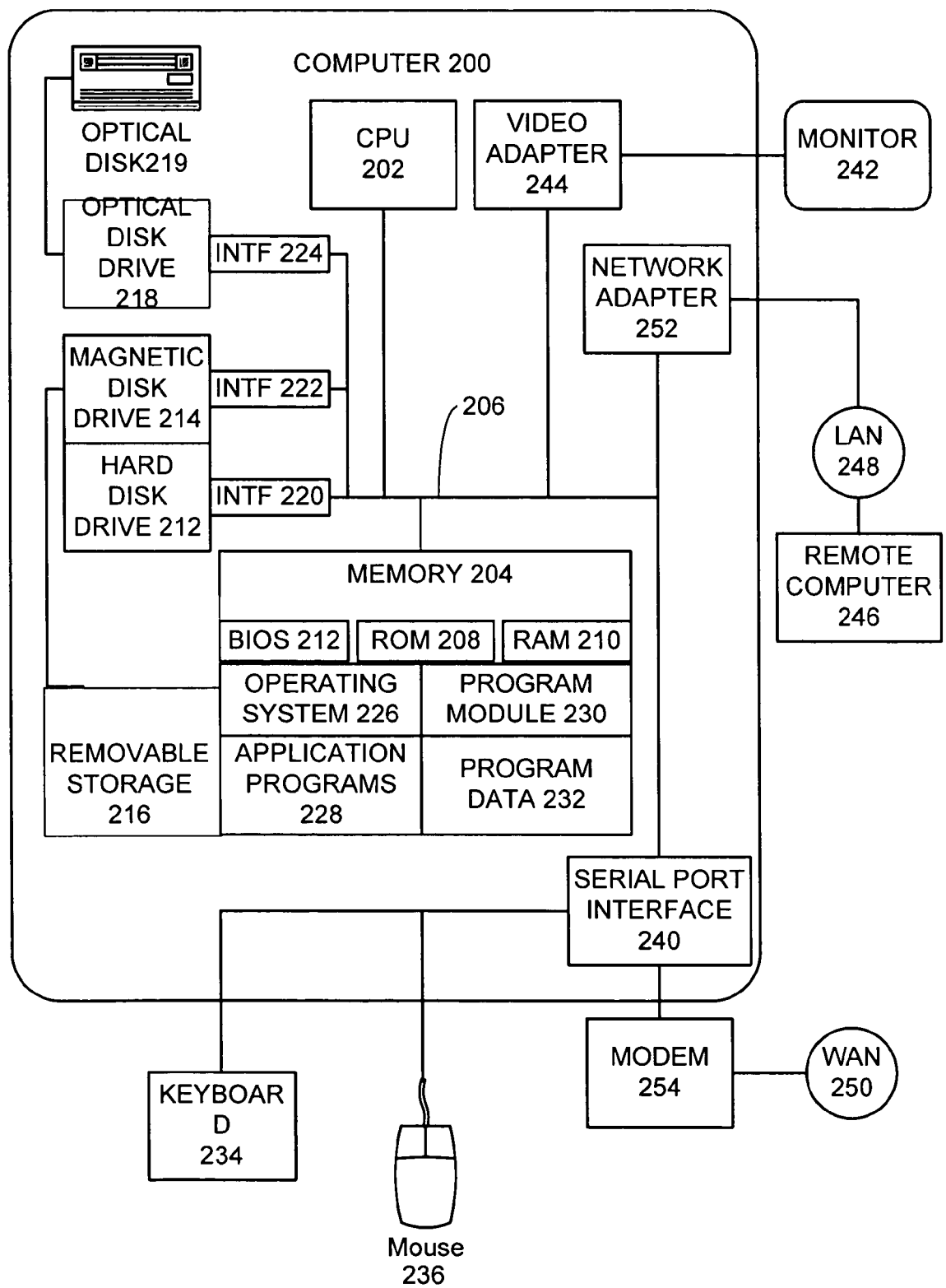
FIG. 2 illustrates a general purpose computing system for use in implementing as one or more computing embodiments of the present invention.

With reference to FIG. 2, an exemplary system for implementing the invention includes a general-purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the personal computer 200, is stored in ROM 208.

The personal computer 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, personal computers typically include other peripheral output devices (not shown), such as speakers and printers.

The personal computer 200 may operate in a networked environment using logical connections to one or more remote computers, such as a remote computer 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 3:
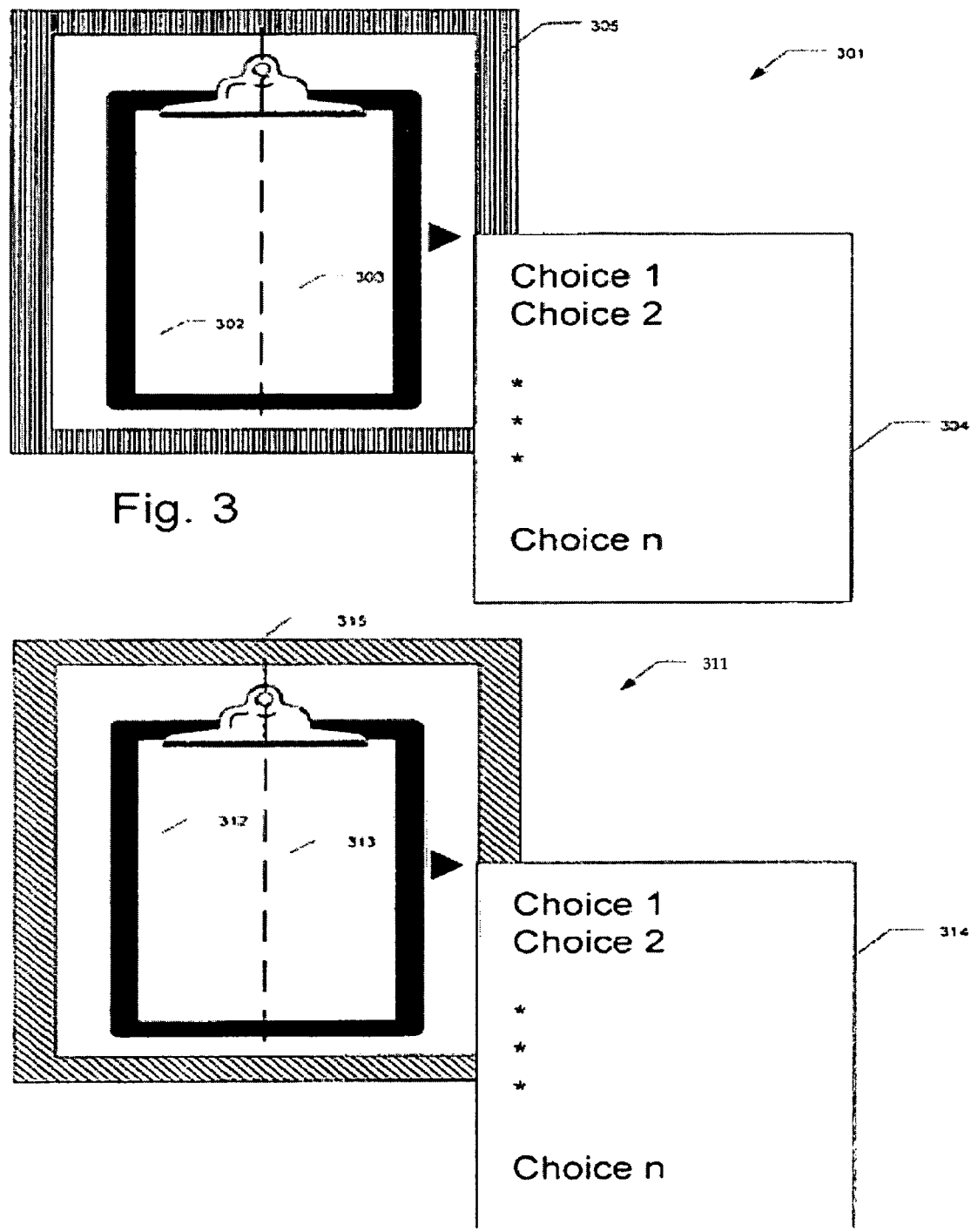
FIG. 3 illustrates a pair of gallery control objects having a focus property and having a selection property according to another embodiment of the present invention.

FIG. 3 illustrates a pair of gallery control objects having a focus property and having a selection property according to another embodiment of the present invention. Each of these two gallery control objects 301-311 possess the various components discussed above in reference to FIG. 1. These components include a selection portion of the icon 302, 312, a properties portion of the icon 303, 313, and a pop-up menu 304, 314. The size and location of the selection portion 302, 312 and the properties section 303, 313 of the icon may be changed to permit an emphasis upon one of the two portions without deviating from the present invention as recited within the claims. For example, the selection portion 302, 312 may constitute all of the area of an icon except a small area that encompasses a pop-up menu arrow 306, 316 when the gallery control is expected to predominantly select gallery control objects rather than change their properties. In this example, the corresponding properties portion 303, 313 would be the area around and including the pop-up menu arrow 306, 316. Of course, a gallery control window that expects properties of gallery control objects to be modified more than the objects are selected may construct the area for each of these portions of the icon in a different manner without deviating from the spirit and scope of the present invention as recited within the attached claims. In addition, these gallery control objects 301-311 contain a status indication 305, 315 that indicates if the gallery control object possesses a selection property, a focus property, or neither of these properties.

In order to understand the use of the gallery control object, the distinction between the focus property and the selection property is needed. Gallery control objects typically operate upon one of several situations within the main application window 100. First, the gallery control object may operate upon the entire contents of the main application window 100. This may correspond to operating upon the entire contents of a file. Within a word processing application, the entire main application window would correspond to the entire document. When an application possesses more than one main window, such as a word processing application that possesses a main text window, a header/footer window, a comments window, and a footnotes/endnotes window, the gallery control object may also apply to each of these windows, or possibly a subset of all windows, such as a currently active window.

Next, the gallery control object 301, 311 may operate upon only a portion of the contents of a window. Typically, this portion is operated by a user selecting the portion of the window to which the gallery control object is to be applied. Of course, one skilled in the art will recognize that windows that have organizational structures such as sections, pages, paragraphs, sentences, words and similar areas of organized content may be used as the portion of the main application window that is to be affected by the application of the gallery control object 301 without deviating from the spirit and scope of the invention recited within the attached claims. In a word processing application, the portion of a main application window 100 to be selected is typically highlighted to visually distinguish the selected items and text from the non-selected portions of the main application window. The application of the gallery control object 301 will apply only to the selected portion of the main application window 301.

Finally, gallery control objects may also operate upon an insertion point placed within the main application window 100. An insertion point indicates a place within a main application window 100 where items are to be placed when inserted into the window 100. For example, an insertion point in a word processing application is the location within the window 100 where text will be added when a user types on an input device. The gallery control object 301 operates upon the insertion point, in the same way it works upon the above described portions of the window, except that the changes made to the insertion point apply only to items inserted into the window at the insertion point after the gallery control object 301 has been applied. The gallery control may also be used to insert content into the document at the insertion point (ClipArt Gallery, Office Clipboard) In the word processing example above, the application of a text formatting gallery control object 301 to an insertion point will change the format for the text to be inserted at the insertion point to correspond to the formatting set by the gallery control object 301.

Another common use for gallery controls is to create or open an entirely different document rather than operate upon a portion or all of an existing document contained within an open main application window. For example, gallery controls that provide "Search" and "Crash Recovery" open other documents in new main application windows rather than change selected portions of an open window. The "Search TaskPane" allows a user to search for such things as files, email messages or web pages based on their title, contents or other properties. It presents a list of found items in a gallery control with options such as open, open as template, copy link to clipboard or view properties. The "Crash Recovery TaskPane" contains a gallery control listing documents in use at the time of a crash. These documents can be opened, saved, or deleted via the context menu.

The Focus Property for a gallery control object 302 indicates the identity of a gallery control object 311 whose individual properties are being modified without having the changes applied to items within the main application window. A gallery control object 311 having focus corresponds to a gallery control object that itself is being edited in some fashion. Using the word processing example, a gallery control window 101 may contain a set of predefined text formatting settings. The settings for each gallery control object 301 may include a font type, a font size, one or more font formatting settings for underlining, bold, and italicized text, and similar formatting settings. When a particular gallery control object 301 is selected with a mouse click upon the selection portion 311 of the control 301, all of these pre-defined settings are applied to the selected portion of the main application window.

If a user desires to modify, copy, or delete one of these gallery control objects 301, the gallery control object 301 being modified, copied or deleted is given a focus property to indicate that the internal properties and settings for the gallery control object are being modified. The corresponding status indication 305 is given to the gallery control object 301 while the object has the focus property. Once the gallery control object 301 has been placed into its desired state, a user may select the gallery control object 301 using its selection portion 302 if the modified version of the gallery control object 301 is to be applied to a selected portion of the main application window 100.

A gallery control object 311 has a selection property, and corresponding status indication 315, when the gallery control object 311 corresponds to a control that is currently applied to the portion of the main application window 100 that is currently selected. For the word processing example, the gallery control object 311 that corresponds to the formatting for the current insertion point will be given the selection property if no other item is selected. If a portion of a word processing window 100 is selected and highlighted, the gallery control object 311 corresponding to the formatting settings for the selected text will have and display an indication of the selection property.

The status indication 305, 315 provides a visual mechanism to provide status information regarding the focus and selection property to a user. In an exemplary embodiment, these indications are implemented using a border being drawn around the gallery control object 301, 311. When a gallery control object 301 possesses a selection property, the selection indication is a two pixel wide border in the Windows system selection color (typically blue). When a gallery control object 311 possesses a focus property, the selection indication is a one-pixel width border of the selection color. Of course, one skilled in the art will readily recognize that other color combinations, border patterns, and other visual displays of status for these two properties may be used without deviating from the spirit and scope of the present invention as recited within the attached claims.

One skilled in the art will recognize that the above formatting uses in word processing examples are illustrative of the operation of gallery control objects are recited within the attached claims. These gallery control object may be used in any control window that contains a plurality of settings. One skilled in the art will also recognize that the gallery control objects may not necessarily possess multiple properties that require editing as discussed above if only selection is needed. The need for multiple properties may vary from item to item within a single list.

Figure 4:
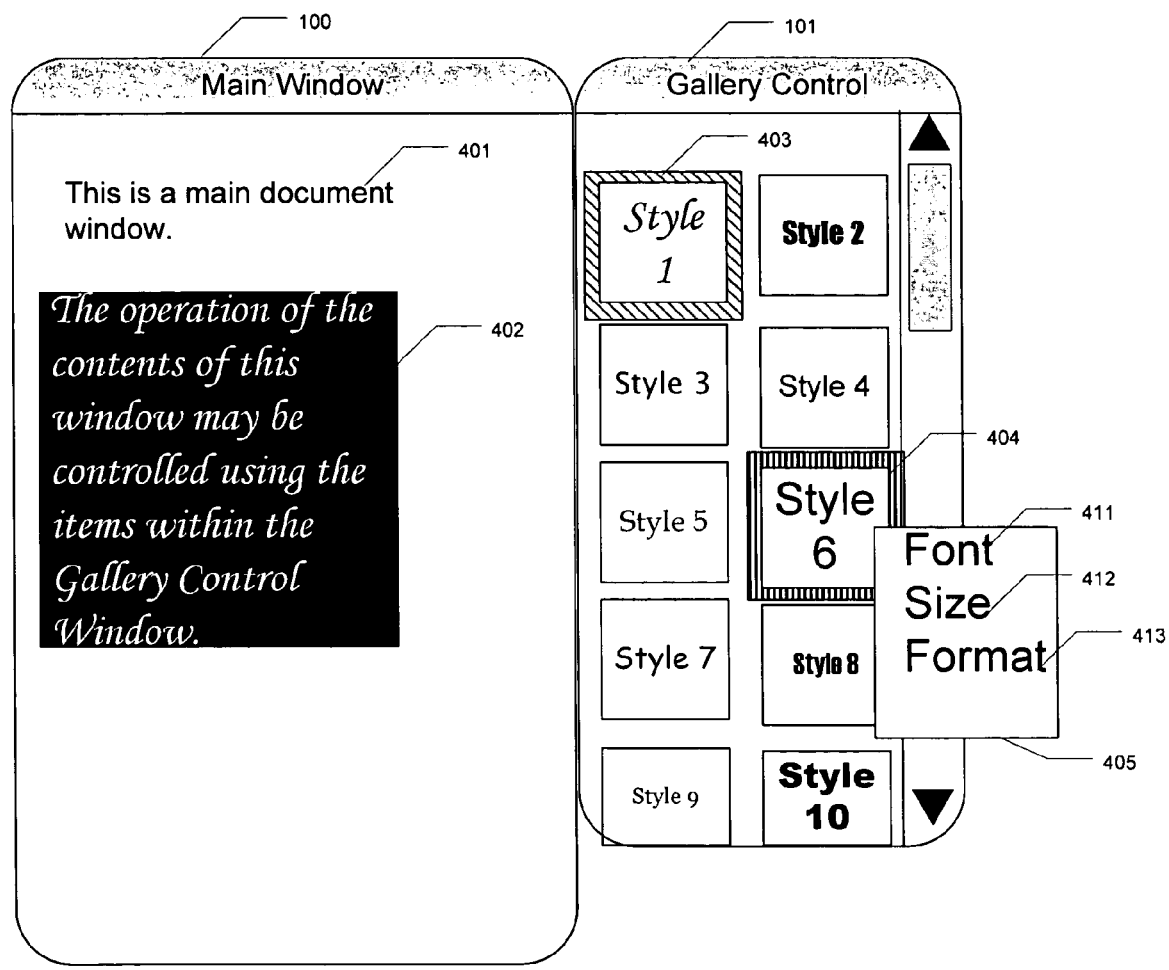
FIG. 4 illustrates a main application window and a gallery control window where a gallery control object applies a selection set by a gallery control object to a selection item within the main window according to yet another embodiment of the present invention.

FIG. 4 illustrates a main application window and a gallery control window where a gallery control object applies a selection set by a gallery control object to a selection item within the main window according to yet another embodiment of the present invention. In this example embodiment, a word processing application is implemented using a main application window 100 and gallery control window 101. Within the main application window 100, two paragraphs 401-402 of text are shown with a second paragraph of text 402 being selected.

The gallery control window 101 is used to control the text formatting of the items within the main application window 100. Within the gallery control window 101, a plurality of text styles are shown as a set of gallery control objects 403-404. Two different paragraphs of text 401-402 are shown in the main application window 100. The second of these two paragraphs 402 is shown in reverse video to illustrate that its text has been selected and highlighted. When this text 402 is selected, the corresponding gallery control 403 that contains its formatting is marked as having the selection property. A second gallery control 404 is shown having a focus property with an activated pop-up menu 405 that presents a set of format-related menu choices 411, 412, and 413 that are used to modify the properties of the gallery control having the focus property 404.

All of the text within the gallery controls are shown with the text rendered in its corresponding format that includes a font type, a font size and text format. The formatting for rich icon text within the gallery control having the selection property 403 matches the text formatting for the selected second paragraph 402. A user may change the formatting for this selected text 402 by simply clicking upon the selection portion of any gallery control.

Figure 5:
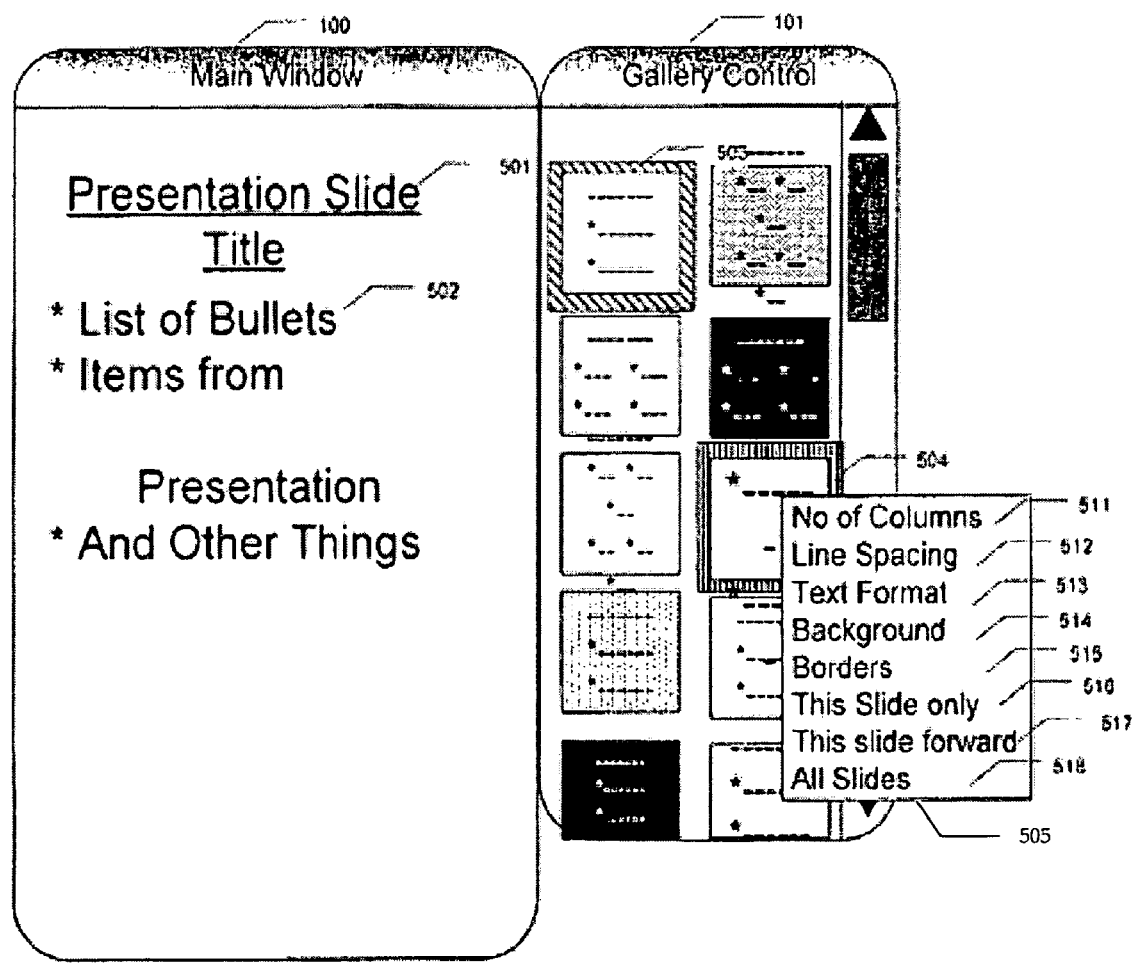
FIG. 5 illustrates another main application window and a gallery control window where another gallery control object applies a selection set by a gallery control object to a selection item within the main window according to yet another embodiment of the present invention.

FIG. 5 illustrates another main application window and a gallery control window where another gallery control object applies a selection set by a gallery control object to a selection item within the main window according to yet another embodiment of the present invention. This example embodiment of a gallery control illustrates a formatting operation for MICROSOFT POWERPOINT. The presentation slide within the main application window 100 includes a slide title 501 and a plurality of bullet items 502.

The gallery control window 101 includes a plurality of gallery control objects, including a gallery control object possessing the selection property 503 and a gallery control object possessing the focus property 504. As discussed above, the focus property allows a user to modify the properties associated with the gallery control object 504 before it is applied to the presentation slide within the main application window. The pop-up menu 505 includes a set of menu options 511-518 items that control the property settings 511-515 for this gallery control object 504 being modified as well as control how this gallery control object is to be applied 516-518 to the main application window 101. The various gallery control objects 503-504 include a rich content icon that renders a depiction of how the presentation slide will be created if the corresponding gallery control object is selected. These icons include a depiction of the text font and style, the slide background, any borders and other visual objects that may distinguish the various slide designs. As above, the gallery control window is a scrollable window that may contain any number of gallery control objects.

Figure 6:
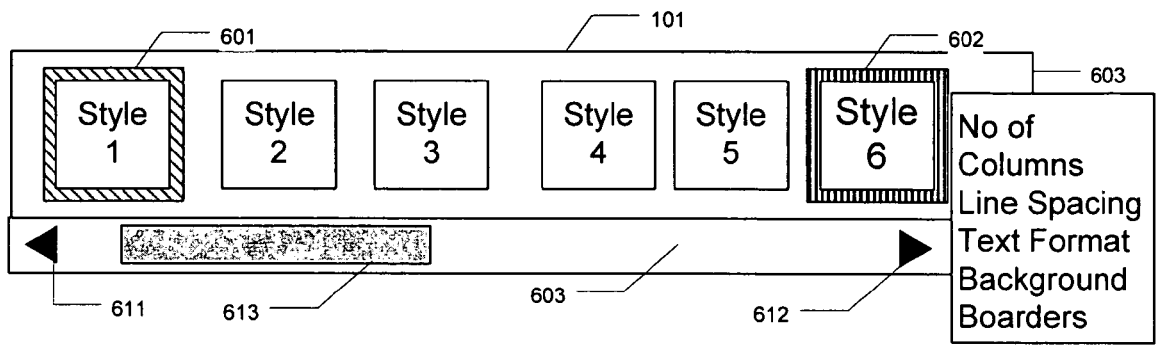
FIG. 6 illustrates a horizontal gallery control window according to another embodiment of the present invention.

FIG. 6 illustrates a horizontal gallery control window according to another embodiment of the present invention. In this embodiment, the gallery control window 101 is illustrated as a horizontal row of gallery control objects 601-602 within a scrollable window 101 that possesses standard window scrolling controls 611-613. The gallery control window may possess a gallery control object possessing the selection property 601 and the focus property 602 that may be modified using a pop-up window 603. In the example embodiment, only vertical scrolling window controls 611-613 are used. The gallery control objects are arranged to fill the available horizontal space within a gallery control window 101. If additional gallery control objects need to be presented, they are placed within a non-visible portion of a scrollable gallery control window 101. One skilled in the art will recognize that other window scrolling mechanisms, such as horizontal scrolling and two-dimensional scrolling windows, may be used without deviating from the present invention as recited within the attached claims.

Figure 7:
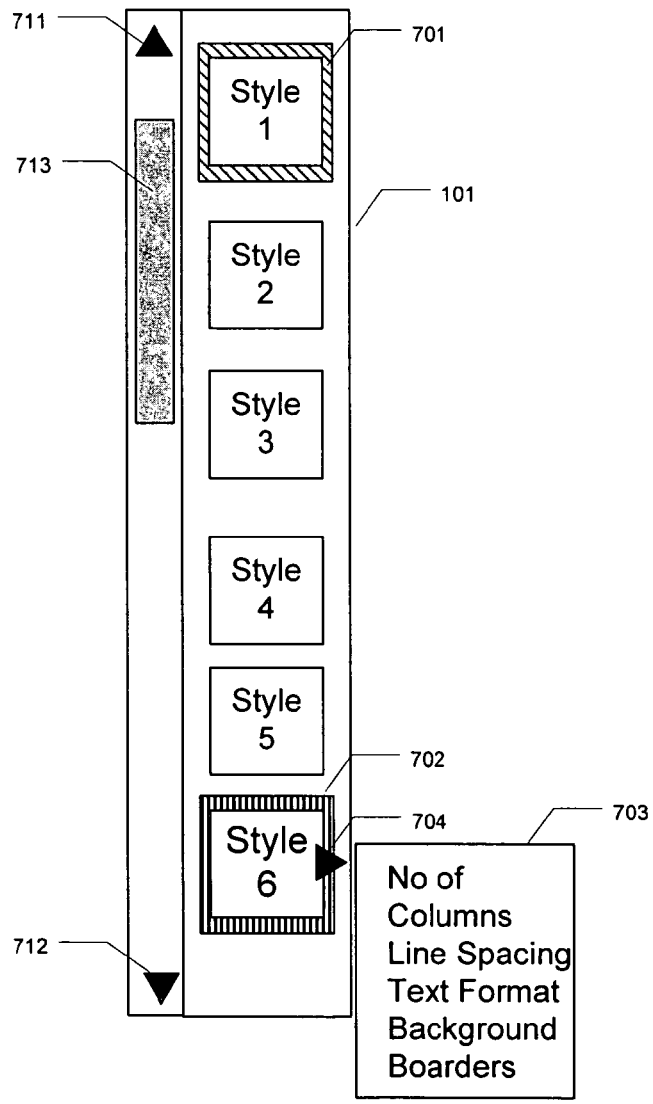
FIG. 7 illustrates a vertical gallery control window according to an embodiment of the present invention.

FIG. 7 illustrates a vertical gallery control window according to an embodiment of the present invention. In this alternate embodiment, the gallery control window 101 is illustrated as a horizontal row of gallery control objects 701-702 within a scrollable window 101 that possesses standard window scrolling controls 711-713. The gallery control window may possess a gallery control object possessing the selection property 701 and the focus property 702 that may be modified using a pop-up window 703.

Figure 8:
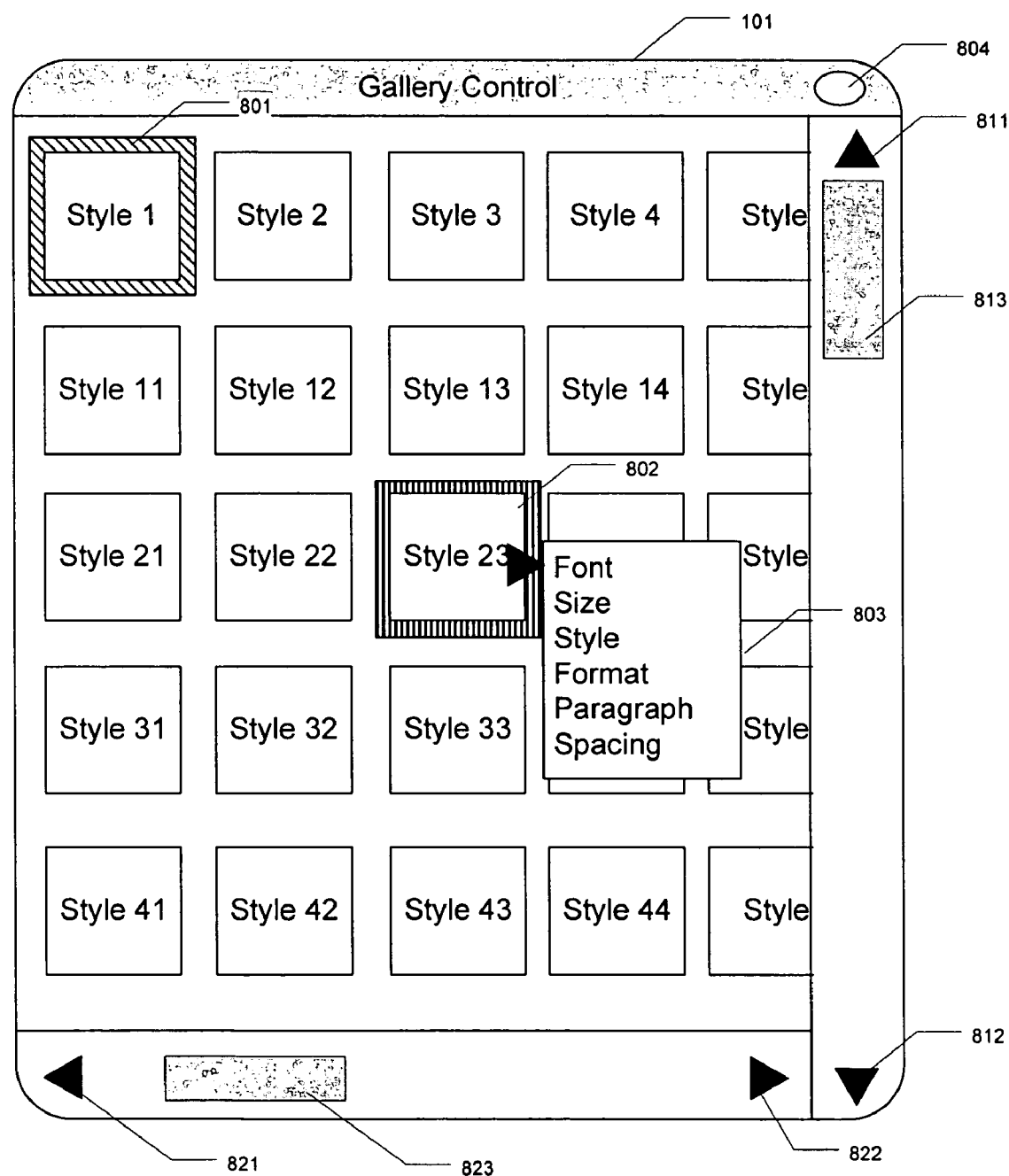
FIG. 8 illustrates a two-dimensional array of gallery control objects within a gallery control window according to yet another example embodiment of the present invention.

FIG. 8 illustrates a two-dimensional array of gallery control objects within a gallery control window according to yet another example embodiment of the present invention. In this additional embodiment, the gallery control window 101 is illustrated as a two dimensional array of gallery controls 101 containing a plurality of horizontal rows of gallery control objects 801-802 within a scrollable window 101. The gallery control window that possesses standard window scrolling controls in the vertical direction 811-813. The gallery control window may possess a gallery control object possessing the selection property 801 and the focus property 802. A gallery control object with the focus may be modified using a pop-up window 803 by clicking on the properties portion of the object 303 or a keyboard shortcut.

Like all windows within a windowing graphical user interface such as one found within a computer operating system offered by MICROSOFT in its WINDOWS line of products or offered by APPLE COMPUTER in its MAC OS line of products, a gallery control window 101 may be scaled in size by clicking and dragging an edge of the window to change the dimensions of the window. As the size of the window changes, the contents of the window are arranged to fill the available space with additional items located within a portion of the window that is viewed using the scrolling controls. A horizontal gallery control as shown in FIG. 6 may be turned into either a vertical gallery control shown in FIG. 7 or a 2D gallery control of FIG. 8 by simply changing the dimensions of the gallery control window. The organization of the gallery control window is made by attempting to fill the available window with gallery control objects. If space allows multiple rows or multiple columns of gallery control objects, the gallery control window 101 will be rendered as a 2D array shown in FIG. 8.

Typically, the gallery control window 101 is a window that is smaller than the main application window 100 as a user is expected to perform operations upon items within the main application window 100. However, a user may wish to expand the size of the gallery control window to include more gallery objects in order to allow more objects to be visible at a given time. As such, in some embodiments, a fly-out button 804 may be included within the gallery control window that when a mouse click is generated on the button, the gallery control window is quickly expanded to a larger size in both directions. The fly out button may expand the gallery control window 101 to a larger fixed size that is configurable by the user, may expand the gallery control window a pre-determined percentage or multiples of its current size, and may expand the gallery control window 101 to a previously user-defined large size. When a mouse click is generated upon the fly-out button a second time, the gallery control window returns to its prior, small size.

Figure 9:
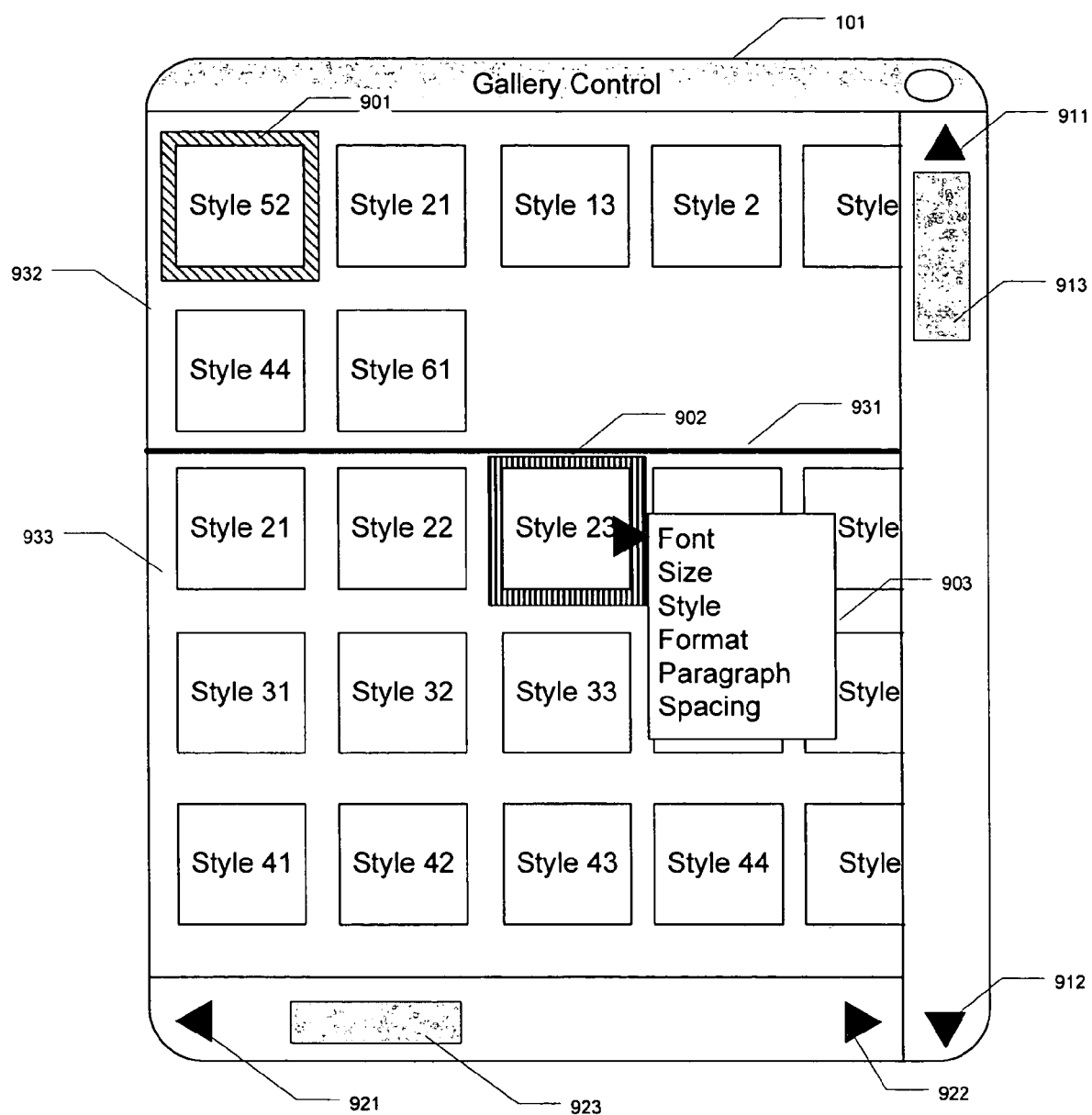
FIG. 9 illustrates a gallery control window containing a most-recently used list according to another embodiment of the present invention.

FIG. 9 illustrates a gallery control window containing a most-recently used list according to another embodiment of the present invention. In this additional embodiment, the gallery control window 101 is again illustrated as a two dimensional array of gallery controls 101 containing a plurality of horizontal rows of gallery control objects 901-902 within a scrollable window 101. The gallery control window that possesses standard window scrolling controls in the vertical direction 911-913. The gallery control window may possess a gallery control object possessing the selection property 901 and the focus property 902 that may be modified using a pop-up window 903.

The gallery control window 101, however, is divided into two parts: an MRU portion (most recently-used) 932 and a main gallery portion 933. These two portions 932-933 of the gallery control window 101 are separated by a MRU dividing line 931 that provides a visual and spatial separation from the two portions of the window 101. When a gallery control object is selected within the main gallery portion 933 for application to one or more items in the main application window 100, the selected item is added to the MRU portion 932. The list of items in the MRU portion may be presented in its own order, including alphabetical by name, an increasing or decreasing list by date of last use, or any manner in which the items are to be organized. The list of items within the main gallery portion 933 includes all available gallery control objects organized in any manner as well. The gallery control objects in the MRU portion 932 will also appear, along with any indication of both the selection property and the focus property, in the main gallery portion 933. The use of the window scrolling controls 911-913 may cause the entire contents of the gallery control window 101 to scroll. As such, the MRU portion 932 may be located within a non-visible portion of the scrolled gallery control window. One skilled in the art will recognize that the MRU portion 932 may be fixed in place within the main portion 933 being scrollable as well as the MRU portion 932 and the main portion 933 being separately scrollable without deviating from the spirit and scope of the present invention as recited within the attached claims.

While the use of the multiple portions 932-933 of the gallery control window 101 that are divided by a MRU dividing line 931 are being used to create a list of MRU gallery controls that are listed in a separate list in addition to a main list, one skilled in the are will recognize that this construct of concatenating multiple list of gallery control items separated by one or more dividing line may also be used on many other embodiments without deviating from the spirit and scope of the present invention as recited within the attached claims.

Figure 10:
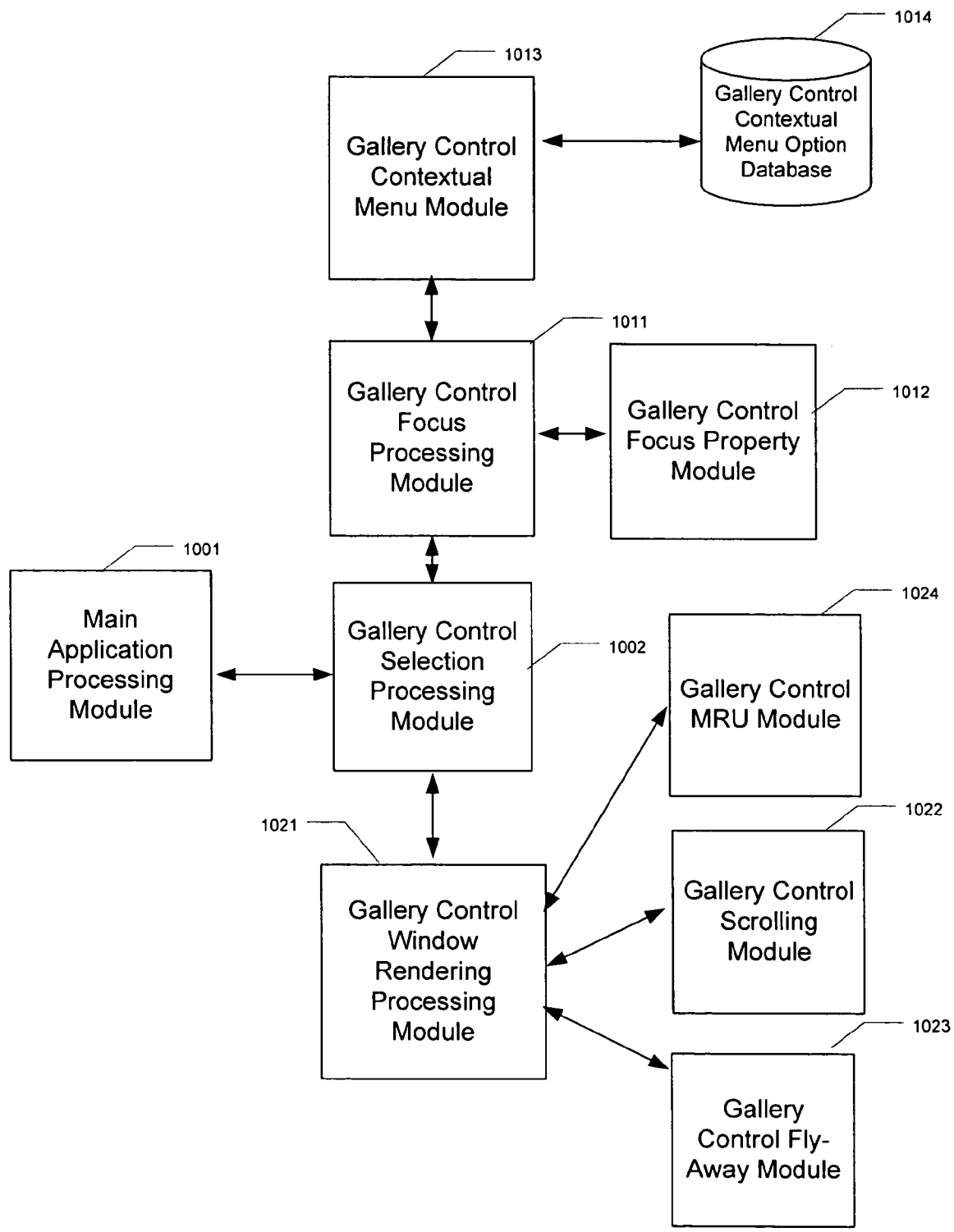
FIG. 10 illustrates a set of processing modules used to implement a gallery control according to an embodiment of the present invention.

FIG. 10 illustrates a set of processing modules used to implement a gallery control according to an embodiment of the present invention. The underlying application program implemented within the main application window 100 is controlled by processing performed by and within a main application processing module 1001. This module 1001 interacts with a gallery control window through a gallery control selection processing module 1002. The selection control module 1002 applies the properties of a gallery control object to the appropriate portions of the main application window 100 when a mouse click is generated on a selection portion of the corresponding gallery control object.

A gallery control object that has a focus property is controlled by the gallery control focus processing module 1011. The focus processing module 1011 interacts with a gallery control contextual menu module 1013 to obtain the appropriate pop-up menu and set of menu items for the gallery control object being modified. The pop-up menu and corresponding set of menu items for each gallery control object are provided by code specific to that control via control user callbacks. The existence of a menu and the number of items in the menu can vary for each item in the gallery control. Alternatively, all of the data needed to render the individual pop-up-menus containing the customizable lists of menu items may be located within a single gallery control contextual menu option database 1014 that is accessed to obtain the needed list of menu items when a pop-up menu is rendered.

The focus processing module 1011 interacts with a gallery control focus property module 1012 to obtain and modify the properties of the gallery control object in response to a user command applied to a pop-up menu item on the gallery control object. Once these properties are set in the module 1012, the properties may be applied to items within main application window 100 using the selection processing module 1002.

The selection processing module 1002 also interact with a gallery control window rendering module 1021 to generate the gallery control window as the above described arrangements of gallery control objects for use by a user. The window rendering module 1021 interacts with a gallery control MRU module 1024 to maintain a set of lists of gallery control objects to be presented to a user separately. The window rendering module 1021 interacts with a gallery scrolling module 1022 to process mouse clicks that modifies the portion of the gallery control window that is presented to a user when the gallery control window 101 is scrollable. The window rendering module 1021 interacts with a gallery control fly-out module 1023 to process mouse clicks that modifies the portion of the gallery control window that is presented to a user when the user re-sizes the gallery control window.

Figure 11:
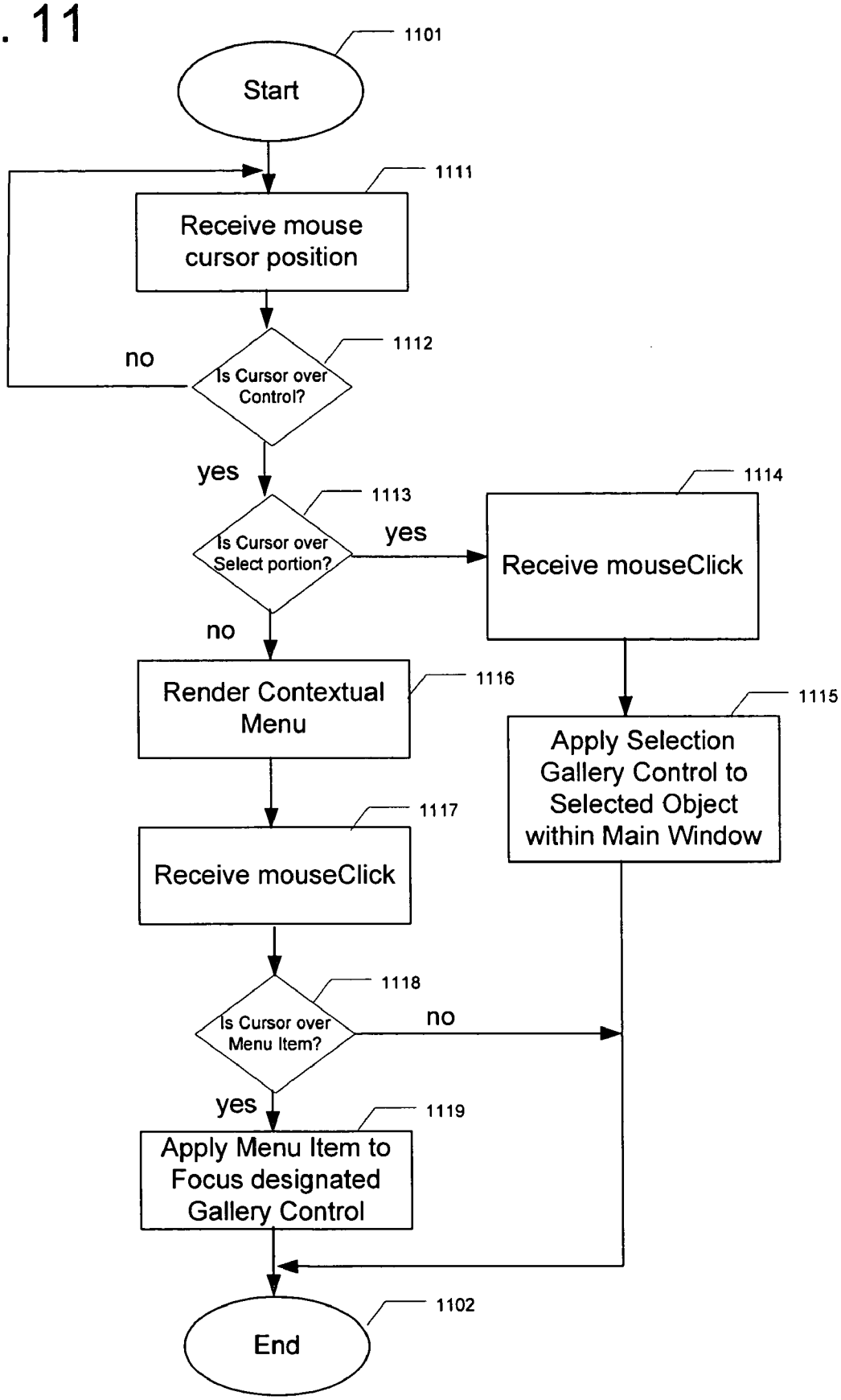
FIG. 11 illustrates an operational flow for the gallery control processing system according to an embodiment of the present invention.

FIG. 11 illustrates an operational flow for the gallery control processing system according to an embodiment of the present invention. The process begins 1101 and receives a mouse cursor position in module 1111. Test module 1112 determines if the mouse cursor position is located over a gallery control object. If test module 1112 determines that the mouse cursor position is not over a gallery control object, the processing returns to module 1111 to wait for the next mouse cursor position update. The processing remains in this loop until the mouse cursor position is located over a gallery control object. In the exemplary embodiment, the mouse cursor position is determined when a mouse move message is received from the OS. One skilled in the art will recognize that a process that repeatedly obtains the current mouse cursor position on an idle operation may be used as well without deviating from the spirit and scope of the present invention as recited within the claims attached herein. If the mouse cursor is over a gallery control item, that item has focus and is drawn that way. The next steps occur if an item is clicked.

When test module 1112 determines that the mouse cursor position is over a gallery control object, test module 1113 determines if the mouse cursor position is over a selection portion of a gallery control object. If test module 1113 determines that the mouse cursor position is over a selection portion of a gallery control object, the processing continues to module 1114 where the module 1114 obtains the mouse click and then applies the selected gallery control's properties to a corresponding selected item within the main application window 100 in module 1115. Once all of these control properties have been applied to the main application window item, the processing ends 1102.

If test module 1113 determines that the mouse cursor position is not over a selection portion of a gallery control object and thus is over a properties portion of the gallery control object, a contextual menu for the corresponding gallery control object is rendered onto the user's interface screen in module 1116. The process awaits a mouse click in module 1117 that indicates that a user is selecting a menu item from the contextual pop-up menu. Once the mouse click is received, test module 1118 determines if the mouse click is located upon a menu item from the pop-up menu. If the mouse click is determined by module 1118 not to be over a menu item, the processing ends 1102. Otherwise, processing associated with the menu item corresponding to the location of the mouse click is executed to change one ore more properties of the corresponding gallery control object for use when this gallery control object is selected. Once the menu item processing of module 1119 is completed, the processing ends 1102.

While the above embodiments of the present invention describe the interaction of a property control window from a main application window, one skilled in the are will recognize that a user interface control for selecting one or more options from a larger set of options where each of the options has a set of one or more user selectable properties may actually encompass a large number of variations on the type of controls used. As long as the gallery controls used include the elements recited within the attached claims, the present invention to would be useable in the manner recited within the attached claims. It is to be understood that other embodiments may be utilized and operational changes may be made without departing from the scope of the present invention.

FIGS. 2 and 10 illustrates an example of a suitable operating environment 110 in which the invention may be implemented. The operating environment is only one example of a suitable operating environment 110 and is not intended to suggest any limitation as to the scope of use or functionality of the invention. Other well known computing systems, environments, and/or configurations that may be suitable for use with the invention include, but are not limited to, personal computers, server computers, held-held or laptop devices, multiprocessor systems, microprocessor-based systems, programmable consumer electronics, network PCs, minicomputers, mainframe computers, distributed computing environments that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

A computing system 200 typically includes at least some form of computer readable media. Computer readable media can be any available media that can be accessed by the computing system 200. By way of example, and not limitation, computer readable media may comprise computer storage media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by the computing system 200.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

While the above embodiments of the present invention describe a personal computer processing system, one skilled in the art will recognize that the various distributed computing architectures may be used to implement the present invention as recited within the attached claims. It is to be understood that other embodiments may be utilized and operational changes may be made without departing from the scope of the present invention.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, or computer storage medium for providing a user interface control to modify properties of items within a main application window.

What is claimed is:

1. A method for providing a user interface control, the method comprising:
   providing a main application window having at least one application item;
   providing a gallery control window having at least one control object for affecting a behavior of the at least one application item, the at least one control object comprising:
      a graphical icon providing a visual depiction associated with at least one property being implemented by the at least one control object, wherein providing the visual depiction comprises previewing the at least one property by at least one of the following: a formatted text and a thumbnail image,
      a selection portion providing a first area for selecting the at least one control object, and
      a properties portion providing a second area operative to cause, upon selection, a display of information associated with the at least one property being implemented by the at least one control object;
   determining a cursor position relative to the at least one control object;
   if the cursor position is over the selection portion of the at least one control object and a selection input is received:
      applying the at least one property of the at least one control object to the at least one application item within the main application window; and
   if the cursor position is over the properties portion of the at least one control object and a property selection input is received:
      rendering a dropdown menu with at least one menu item associated with the at least one property of the at least one control object,
      upon receiving an indication of a selection of the at least one menu item, enabling modification of the at least one property of the at least one control object, and
      rendering another graphical icon of the at least one control object, the other graphical icon depicting the at least one property associated with the selection of the at least one menu item.

2. The method according to claim 1, wherein determining the cursor position relative to the at least one control object comprises:
   identifying when the cursor is hovering over the one of the selection portion and the properties portion of the at least one control object.

3. The method according to claim 1, wherein receiving the selection input comprises:
   receiving a mouse click on the selection portion of the at least one control object.

4. The method according to claim 1, wherein enabling the user to modify the control properties of the at least one control object comprises:
   receiving a mouse click upon the at least one menu item; and
   determining an identity of the selected menu item from a location of the mouse click.

5. The method according to claim 4, wherein the at least one menu item is determined by a current state of the at least one control object.

6. A computer storage medium with computer-readable instructions encoded thereon which, when executed on a computing device, carry out a method for providing a user interface control, the method comprising:

provshamrock providing a main application window having a plurality of application items;

providing a gallery control window having at least one control object for affecting a behavior of at least one of the plurality of application items, the at least one control object comprising:

a graphical icon providing a visual depiction associated with at least one property being implemented by the at least one control object, wherein providing the visual depiction comprises previewing the at least one property by at least one of the following: a formatted text and a thumbnail image, a selection portion providing a first area for selecting the at least one control object, and a properties portion providing a second area operative to cause, upon selection, a display of information associated with the at least one property being implemented by the at least one control object;

determining a cursor position, wherein determining the cursor position comprises determining whether the cursor is hovering over the at least one control object based on user action;

if the cursor position is hovering over the selection portion of the at least one control object and a selection input is received, applying the at least one property of the selected at least one control object to a selected one of the plurality of application items; and if the cursor position is hovering over the properties portion of the at least one control object and a properties selection input is received:

rendering a menu with a plurality of menu items associated with modifying the at least one property of the at least one control object, upon receiving an indication of a user selection of one of the menu items:

enabling a user to modify the at least one property of the at least one control object represented by the selected menu item, and in response to modification of the at least one property, modify the visual depiction associated with at least one property being implemented by the at least one control object.

7. The computer storage medium of claim 6, wherein the instructions further comprise:

if an indication of the user selection of the at least one control object is received following a modification of the at least one property associated with the selected at least one control object, applying the modified at least one property of the selected at least one control object to the selected application item within the application window.

8. The computer storage medium of claim 6, wherein receiving the selection input comprises:

receiving a mouse click on the selection portion of the at least one control object.

9. The computer storage medium of claim 6, wherein enabling the user to modify the at least one property of the at least one control object represented by the selected menu item comprises:

receiving a mouse click upon one of the plurality of menu items; and determining an identity of the selected menu item from a location of the mouse click.

10. The computer storage medium of claim 9, wherein rendering the menu with a plurality of menu items comprises rendering the menu with the plurality of menu items determined by a current state of the control object.

11. A system for providing a user interface control, the system comprising:

a memory storage; and a processing unit coupled to the memory storage, wherein the processing unit is operative to:

provide a main application window having at least one application item;

provide a gallery control window having at least one control object for affecting a behavior of the at least one application item, the at least one control object comprising:

a graphical icon providing a visual depiction associated with at least one property being implemented by the at least one control object, wherein providing the visual depiction comprises previewing the at least one property by at least one of the following: a formatted text and a thumbnail image, a selection portion providing a first area for selecting the at least one control object, and a properties portion providing a second area operative to cause, upon selection, a display of information associated with the at least one property being implemented by the at least one control object;

determine a cursor position relative to the at least one control object;

if the cursor position is over the selection portion of the at least one control object and a selection input is received:

apply the at least one property of the at least one control object to the at least one application item within the main application window; and if the cursor position is over the properties portion of the at least one control object and a property selection input is received:

render a dropdown menu with at least one menu item associated with the at least one property of the at least one control object, upon receiving an indication of a selection of the at least one menu item, enable modification of the at least one property of the at least one control object, and render another graphical icon of the at least one control object, the other graphical icon depicting the at least one property associated with the selection of the at least one menu item.

12. The system according to claim 11, wherein the processing unit being operative to determine the cursor position relative to the at least one control object comprises the processing unit being operative to identify when the cursor is hovering over the one of the selection portion and the properties portion of the at least one control object.

13. The system according to claim 11, wherein the processing unit being operative to receive the selection input comprises the processing unit being operative to receive a mouse click on the selection portion of the at least one control object.

14. The system according to claim 11, wherein the processing unit being operative to enable the user to modify the control properties of the at least one control object comprises the processing unit being operative to:

receive a mouse click upon the at least one menu item; and determine an identity of the selected menu item from a location of the mouse click.

15. The system according to claim 14, wherein the at least one menu item is determined by a current state of the at least one control object.

* * * * *